(12) United States Patent
Jenne et al.

(10) Patent No.: US 10,198,353 B2
(45) Date of Patent: Feb. 5, 2019

(54) DEVICE AND METHOD FOR IMPLEMENTING SAVE OPERATION OF PERSISTENT MEMORY

(71) Applicant: DELL PRODUCTS, LP, Round Rock, TX (US)

(72) Inventors: John E. Jenne, Austin, TX (US); Krishna P. Kakarla, Round Rock, TX (US); Paul Heaton, Austin, TX (US); Vadhiraj Sankaranarayanan, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 0 days.

(21) Appl. No.: 15/644,475

(22) Filed: Jul. 7, 2017

(65) Prior Publication Data
US 2019/0012263 A1 Jan. 10, 2019

(51) Int. Cl.
| | |
|---|---|
| G11C 7/00 | (2006.01) |
| G06F 12/0804 | (2016.01) |
| G06F 3/06 | (2006.01) |
| G05D 23/19 | (2006.01) |
| G05B 13/04 | (2006.01) |

(52) U.S. Cl.
CPC ....... *G06F 12/0804* (2013.01); *G05B 13/041* (2013.01); *G05D 23/1917* (2013.01); *G06F 3/0619* (2013.01); *G06F 3/0647* (2013.01); *G06F 3/0653* (2013.01); *G06F 3/0659* (2013.01); *G06F 3/0673* (2013.01); *G06F 2212/1032* (2013.01); *G06F 2212/205* (2013.01)

(58) Field of Classification Search
CPC .............. G06F 12/0804; G06F 13/041; G06F 23/1917; G06F 3/0647; G06F 3/0659; G06F 3/0673
See application file for complete search history.

(56) References Cited

U.S. PATENT DOCUMENTS

| | | | |
|---|---|---|---|
| 6,052,789 A | 4/2000 | Lin | |
| 7,062,618 B2 * | 6/2006 | Tsunoda | ............... G06F 12/0638 711/154 |
| 7,496,791 B2 * | 2/2009 | Tillmann | ............ G06F 11/3684 714/25 |

(Continued)

OTHER PUBLICATIONS

JEDEC Standard No. 2233-54, Byte Addressable Energy Backed Interface, Version 2.1, Main Memory: DDR4 & DDR5 SDRAM, Aug. 2015, pp. 1-130; https://www.jedec.org/category/technology-focus-area/main-memory-ddr3-ddr4-sdram.

*Primary Examiner* — Pho M Luu
(74) *Attorney, Agent, or Firm* — Larson Newman, LLP

(57) ABSTRACT

An information handling system includes a first memory module having a volatile memory, a non-volatile memory, and a save controller configured to execute a save operation that transfers at least all modified information of the volatile memory to the nonvolatile memory. A power-down controller of the information handling system is connected to the first memory module, and includes a first input to receive a first indicator that indicates the first memory module is to perform the save operation, a second input to receive a second indicator that indicates a thermal characteristic of the system, and control circuitry to provide the save operation indicator to the first memory module to initiate the save operation in response to receiving the first indicator.

19 Claims, 14 Drawing Sheets

(56) References Cited

U.S. PATENT DOCUMENTS

| | | |
|---|---|---|
| 7,725,653 B2 | 5/2010 | Long |
| 8,762,643 B2 | 6/2014 | Ishii |
| 9,003,118 B2 | 4/2015 | Cherian et al. |
| 9,170,932 B1 * | 10/2015 | Lo ................. G06F 12/0246 |
| 9,286,985 B2 * | 3/2016 | Kimura ............ G06F 1/3225 |
| 2006/0080515 A1 | 4/2006 | Spiers et al. |
| 2007/0097569 A1 | 5/2007 | Huang |
| 2008/0005474 A1 | 1/2008 | Long |
| 2009/0031072 A1 | 1/2009 | Sartore |
| 2010/0005285 A1 | 1/2010 | Yun |
| 2013/0097458 A1 | 4/2013 | Sekino et al. |
| 2016/0259649 A1 | 9/2016 | Poomachandran et al. |
| 2017/0052716 A1 | 2/2017 | Jenne et al. |
| 2017/0052791 A1 | 2/2017 | Jenne et al. |
| 2017/0052794 A1 | 2/2017 | Berke et al. |
| 2017/0060697 A1 | 3/2017 | Berke et al. |

* cited by examiner

DEVICE AND METHOD FOR IMPLEMENTING SAVE OPERATION OF PERSISTENT MEMORY

CROSS-REFERENCE TO RELATED APPLICATIONS

Related subject matter is contained in co-pending U.S. patent application Ser. No. 15/644,486 entitled "Persistent Memory Module and Method Thereof," filed on Jul. 7, 2017, the disclosure of which is hereby incorporated by reference.

Related subject matter is contained in co-pending U.S. patent application Ser. No. 15/644,489 entitled "System and Method of Characterization of a System Having Persistent Memory," filed on Jul. 7, 2017, the disclosure of which is hereby incorporated by reference.

FIELD OF THE DISCLOSURE

This disclosure generally relates to information handling systems, and more particularly relates to the transfer of data from a volatile memory of a memory module to a non-volatile memory of the memory module.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

The use of persistent memory in some information handling systems can be important to preserve information in the event of a power failure. One type of persistent memory is known as a Non-volatile Dual In-line Memory Module (NVDIMM), which is a memory module that stores information at a volatile memory during normal operation to maintain high data transfer rates between a requesting master, and saves information from the volatile memory to a non-volatile memory of the memory module when a power failure is detected to maintain persistence of the information.

A memory module, such as an NVDIMM, processes memory access requests, from a memory controller of a host processor, for information stored at a nonvolatile memory location. During normal operation, the memory module also receives commands from the memory module that refresh the nonvolatile memory when the nonvolatile memory is a DRAM. In response to being notified of a power failure, the host processor transfers the contents of its cache, for example, to the NVDIMM, and places the NVDIMM in a self-refresh mode of operation. Once the NVDIMM is in self refresh mode, it can be isolated from the memory controller and be powered from a backup power source, thus maintaining the information stored at its nonvolatile memory. While in self-refresh mode, a control module can provide a save operation indicator via a side bus to have the memory module initiate a save operation during which the information from its volatile memory to a non-volatile memory of the memory module. The command provided to the NVDIMM to implement the save operation can be associated with a three-pulse save operation, wherein a third of three provided pulses causes the NVDIMM to implement the save operation. The timing of the save operations can, therefore, be delayed by controlling when the third pulse is provided. For example, the control module can delay when the save operation indicator is provided to ensure a system specification, such as power consumption or temperature, is maintained. The save operations of different NVDIMMs can be initiated at different times providing separate save signals having the respective timing of their third pulse staggered. This may cause the NVDIMMs to initiate their save operations at different times, which can be useful to reduce power maximum power consumption of a system having multiple NVDIMMs.

In another embodiment, the NVDIMM may communicate with a control module via an external port having one or more interconnects. In response to receiving a command from the control module to implement a save operation, the memory module transfers information from its volatile memory to its non-volatile memory at a rate that is based upon a programmable transfer rate indicator to ensure information stored at the volatile memory can be restored after the memory module has been shut down. The programmable transfer rate indicator can be programmed by the master device or by the memory module itself, such as in a closed-loop manner, to limit a rate at which heat is dissipated into the system.

Systems having NVDIMMs can be characterized to determine the effects of the power usage and thermal output on the system. The characterized power and thermal information can be used to modify the manner in which the NVDIMMs implement their save operations in order to control power and thermal output during a given time.

BRIEF DESCRIPTION OF THE DRAWINGS

It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
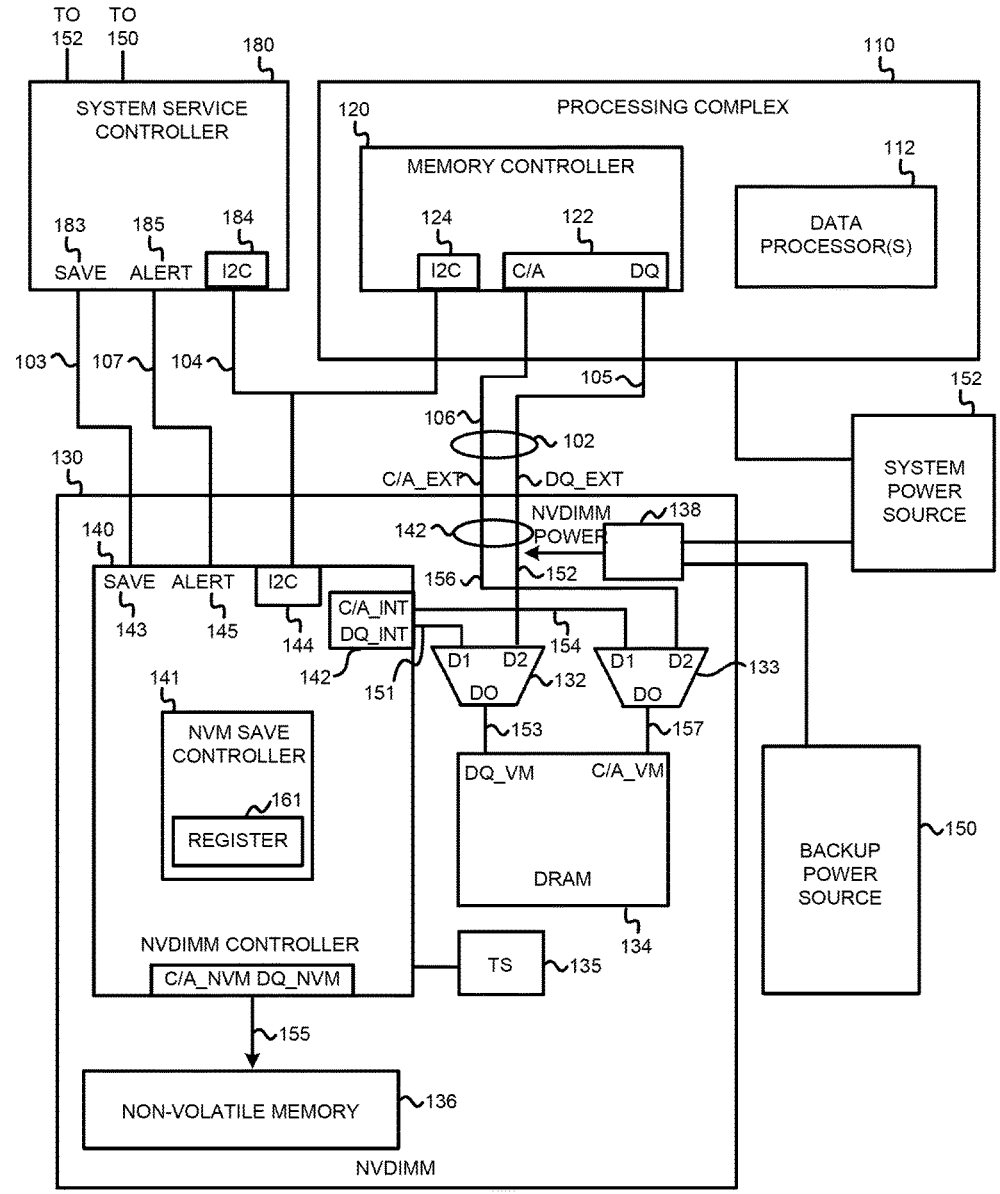
FIG. 1 is a block diagram illustrating an information handling system that includes a memory module according to an embodiment of the present disclosure.

FIG. 1 illustrates portions of an information handling system 100. Information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a server, a network storage device, a switch router or other network communication device, or any other suitable device and may vary in size, shape, performance, functionality, and price. Further, information handling system 100 can include processing resources for executing machine-executable code, such as a central processing unit (CPU), a Programmable Logic Array (PLA), an embedded device such as a System-on-a-Chip (SoC), or other control logic hardware. Information handling system 100 can also include one or more computer-readable medium, in addition to NVDIMM 130, for storing machine-executable code, such as software or data.

The illustrated portion of information handling system 100 includes a processing complex 110, a baseboard management controller 180, a Non-volatile Dual In-line Memory Module (NVDIMM) 130, a system power source 152, a backup power source 150, and other devices, such as a system service controller 180. Capabilities and functions provided by system service controller 180 can vary based on the type of information handling system, and can included multiple components. For example, the system service controller 180 can include a base board management controller (BMC) that is an embedded processor that manages various aspects of the various boards. Thus, as disclosed herein, a BMC represents a processing device different from CPU processing complex 110 that can provide various management functions for information handling system 100. In addition to a BMC, the system service controller 180 can include an application specific device, such as a CPLD, to implement management functions not appropriate for handling by the CPLD, such as management functions that need to happen in a time critical manner. For example, the CPLD may be responsible for handling various functions related to power management, cooling management, remote server management, error handling, and the like. The system service controller 180 includes a control port 184, which is illustrated to be an I2C type port, a SAVE port 183, and an ALERT port 185.

The processing complex 110 can include a memory controller 120 and one or more other processing cores 112. Processing complex 110 can represent circuitry that includes hardware, software, firmware, and other circuit elements associated with the performance of the processing tasks associated with an information handling system. As such, processing complex 110 may be understood to include one or more data processors or processing cores, one or more input/output (I/O) devices such as processor, memory, or I/O controller hub, memory including random access memory (RAM) and read-only memory (ROM), mass data storage devices, video processors, network interface devices, or other devices typical to an information handling system, as needed or desired. In a particular embodiment, the processing complex 110 represents a motherboard, such as a server board that can be populated with one or more NVDIMMs 130. In addition the processing complex 110 can be a master device relative to the memory modules described herein and of the side bus 104 as described in greater detail herein.

Memory controller 120 represents a circuit portion of processing complex 110 that can act as a master relative to NVDIMM 130, by virtue of managing the flow of data between the processing complex 110 and the DRAM portion of one or more NVDIMMs connected to the processing complex 110, including NVDIMM 130. It will be appreciated that the NVDIMMs referenced in the present disclosure, including NVDIMM 130, are a specific type of memory module referred to as an NVDIMM-N by virtue of their having a volatile memory from which a master can access information at a high rate, and a non-volatile memory to which during a save operation the module can store information from its volatile memory to maintain persistence of the information. The term "save operation" as used herein when used in the context of a memory module, such as NVDIMM 130, is intended to refer to the process of the memory module saving information from its volatile memory to its non-volatile memory at the request of a master device for the purpose of being restored from non-volatile memory to volatile memory at a later time. While the present disclosure describes memory modules in the context of an NVDIMM, which are understood to be NVDIMM-N modules, it will be appreciated that memory modules other than DIMMs can be implemented in configurations other than dual in-line configurations, so long as they transfer information from a volatile to non-volatile memory as described herein. For example, the memory module described could be integrated onto a processing complex, and accessed by one or more master devices also integrated at the processing complex.

As illustrated, memory controller 120 includes a memory port 122, and a control port 124. Memory port 122 has control/address and data ports labeled C/A and DQ, respectively, that are connected to NVDIMM 130 via a primary data access memory bus 102. Control port 124 is connected to NVDIMM 130 and system service controller 180 via a side bus 104 and is presumed to be an I2C compatible port, which is a well know serial bus, though other control buses can be used. For ease of description, the same label that is used to refer to a port can also be used herein to refer to the bus connected to that port, and to the information transmitted over the data bus. For example, it will be appreciated that the primary data access memory bus 102 includes a data bus portion 105 that can be referred to as data bus DQ, and a control/address bus portion 106 connected to ports DQ and C/A, respectively, of the memory port 122 of controller 120.

NVDIMM 130 includes an NVDIMM controller 140, a volatile memory 134, also referred to herein by way of example as a DRAM, non-volatile memory 136, which can be a flash type memory, a data bus switch 132, and control/address bus switch 133, a power terminal connected to the system power source 152, and a power terminal connected to the backup power source 150.

NVDIMM controller 140 has a memory port 142, a memory port 143, a control port 144, a save pert 143, and an alert port 145. The memory port 142 communicates with the DRAM 134, and includes a data port, DQ_INT, connected to a port D1 of switch 133, and an address/control port, C/A_INT, connected to a port D2 of switch 134. The memory port 143 communicates with the non-volatile memory 136, and includes a control/address port C/A_NVM and a data port DQ_NVM. Control port 144 is presumed to be an I2C port and is connected to the side bus 104. Port 143, labeled SAVE, is connected to the save port of system service controller 180 via a bus 103, port 145, labeled ALERT, is connected to the alert port 185 of the system service controller.

Switch 132 includes a data port D2 that is connected to the port DQ of the memory controller 120 via bus 105 (DQ_EXT), and a data port DO connected to the data port DQ_VM of the DRAM 134. Thus, when port D2 is selected during normal operation, switch 132 is part of a communication path that communicates information between the data port of memory controller 120 and the data port of DRAM 134 that includes external data pus portion 105, and local data pus portions 152 and 153. When port D1 is selected during a save operation, switch 132 is part of a communication path that communicates information between the data port of the NVDIMM controller 140 and the data port of DRAM 134 that includes local data pus portions 151 and 153.

Switch 133 includes a data port D2 that is connected to the port C/A of the memory controller 120 via internal bus 156, and external bus 106 (C/A_EXT), and a data port DO connected to the port C/A_VM of the DRAM 134. Thus, when port D2 is selected during normal operation, switch 133 is part of a communication path that communicates information between the control/address port of memory controller 120 and the control/address port of DRAM 134 that includes external data pus portion 105, and local data pus portions 156 and 157. When port D1 is selected during a save operation, switch 133 is part of a communication path that communicates control/address information between the control/address port of the NVDIMM controller 140 and the data port of DRAM 134 that includes local data pus portions 154 and 157.

During normal operation, memory controller 130 issues memory access requests to NVDIMM 130 to access information from DRAM 134. The access requests include providing command and address information via port C/A of the memory controller 120 to port C/A of the switch 133 to implement read requests, write requests, and to refresh the DRAM 134. For example, in response to receiving a read or write request from memory controller 120 during normal operation switches 132 and 133 are configured by the NVDIMM controller 140 to selectively communicate information between their respective D2 and DO ports. Thus, in response to receiving the control/address information from the memory controller 120, the DRAM 134 provides or receives data at its data port (DQ_VM) that is communicated to, or from, the data port DO of switch 132.

By way of example, system service controller 180 is presumed to be configured to determine when a system power failure has occurred. For example, the CPLD of system service controller 180 can monitor a plurality of power OK (POK) from a corresponding plurality of power supplies making up the system power source 152 to determine if there is a sufficient number of operational power supplies to ensure proper system operation. In an embodiment, the minimum number of power supplies needed by the system can be determined by the BMC during configuration of the system and programmed to the CPLD. In response to determining a power failure condition, the CPLD can notify the processing complex 120. For example, according to an embodiment, the processing complex 120 can include a Platform Control Hub (PCH), as used with Intel-based processors, to which the CPLD sends a signal to trigger Asynchronous DRAM Refresh (ADR). In response, the PCH will notify the processing complex 110 to flush its caches, and other volatile information, to NVDIMM 130 in anticipation of losing power After processing complex 110 has finished flushing desired information to the NVDIMM 130, the processing complex 110, in conjunction with the memory controller 120, can place the NVDIMM 130 in self-refresh mode, which allows subsequent isolation of the NVDIMM 130 from the memory controller 120. Subsequently, the processing complex can be shutdown.

After the processing complex has placed the NVDIMM 130 in self-refresh mode, the CPLD of system service controller 180 can provide a self-refresh indicator to the NVDIMM controller 140 that indicates the NVDIMM 130 is in self refresh mode. It will be appreciated that the manner in which the system service controller 180 determines the NVDIMM 130 is in self-refresh can vary. For example, the PCH can maintain a fixed timer that is sufficiently long to know all data as been stored to NVDIMM 130, and provide an indictor to the CPLD after the timer has expired. In other embodiments, CPUs of the processing complex can affirmatively notify the CPLD when NVDIMM 130 is in self-refresh.

According to an embodiment, the self-refresh indicator can include the first two pulses of three pulses generated during a three-pulse SAVE Trigger Mode as specified by the JEDEC Standard No. 2233.54, and provided via the SAVE bus 104, wherein the second of the first two pulses causes NVDIMM controller 140 to isolate NVDIMM 130 from the bus 102 by configuring switches 132 and 133 to communicate control/address and data information to DRAM 134 from the NVDIMM controller 140. In addition, the NVDIMM controller 140 can configure power switch 138 to receive power from the backup power source 150 instead of from the system power source, in response to receiving the self refresh indicator. It will be appreciated, that the system service controller 180 will also be powered by the backup power source 150 subsequent to loss of power from the system power source 152.

Next, the system service controller 180 can generate a save operation indicator that results in the NVDIMM 130 being notified to perform a save operation. The save operation indicator can be the third of the three pulses described by the JEDEC three-pulse save of the above referenced JEDEC standard. The term "JEDEC three-pulse save" as used herein is intended to refer to the features of the three-pulse save trigger mode of the JEDEC Standard No. 2233-54.

In a particular embodiment, backup power source 150 represents a battery device that powers NVDIMM 130 and any other NVDIMM devices of information handling system 100, as needed or desired, in order to conduct the runtime save operation on the information handling system that enables persistence of the NVDIMM 130. In another embodiment, power source 150 represents one or more super-capacitors that are configured to provide power to NVDIMM 130 and other NVDIMM devices of information handling system 100, as needed or desired, in order to conduct the runtime save data operation on the information handling system.

As the number of NVDIMMs used in information handling system increases, and as the use of NVDIMMs becomes more popular, the amount of energy that needs to be provided by the backup power source 150 can increase. Similarly, the amount of power needed from the backup power source 15 increases as a greater number of NVDIMMs implement concurrent save operations. The need for power and energy reduction techniques to facilitate an increased number of NVDIMMs has been recognized.

For example, it has been proposed to monitor which information stored in DRAM 134 of an NVDIMM has been modified since being stored in non-volatile memory 136, and to only transfer this information to non-volatile memory 136 during a save operation, thus reducing the energy and power required by the NVDIMM. Thus information handling system 100 can operate to monitor data usage on NVDIMM 130 to determine which data stored at volatile memory 134 has been modified since being last saved to nonvolatile memory 136. In an embodiment, processing complex 110, which can represent a specific server board of a rack of server boards can determine which rows of data in the volatile memory 134 have been modified since a previous save data operation has occurred an the NVDIMM 130. Then, when a next save data operation is initiated at the NVDIMM, this information can be used by the NVDIMM so that only the rows with modified data are stored to the non-volatile memory device. In this way, the energy demand on NVDIMM power source 150 can be reduced. It has also been proposed to determine, such as during an initialization process, an amount of energy and power needed by an information handling system, and configure the system based upon this information to ensure sufficient energy and power is available from the backup power source 150. For example, processing complex 110 can disabled NVDIMMS from being used as persistent memory during normal operation if it is determined there is not sufficient power or energy available from the backup power source to ensure persistent data integrity of a save operation.

While various power and energy saving techniques have been proposed that ensure sufficient power and energy is available ensure completion of a save operation, it has been observed by the inventors that merely ensuring sufficient of power and energy to the NVDIMMs during a save operation may not sufficient to guarantee persistence of the information stored at the DRAM of an NVDIMM. For example, it has been realized by the inventors that even when sufficient backup power and energy is available during a power failure, the amount of heat generated by the NVDIMMs during the save operation may exceed the thermal requirements of the system, an in particular of the NVDIMMs themselves. This can be especially problematic when one or more cooling techniques of an information processing system is compromised during power failure, such as can be found in data center applications that include server cabinets having multiple server boards.

To address this problem, the NVM save controller 141 can be configured according to an embodiment to limit the rate of thermal output of the NVDIMM 130 during a save operation. According to such an embodiment, the rate of thermal output is controlled by changing the rate at which information is transferred from volatile memory 135 to non-volatile memory 136 during a save operation. For example, an indicator of the desired transfer rate can be stored at a storage location of the NVDIMM, such as at register 161. The transfer rate indicator can be based upon one or more temperature readings from a thermal sensor 135 of the NVDIMM. Thermal sensor 135 can be located at various locations of the NVDIMM 130, or based upon temperature information from sensors external the NVDIMM, for example, the temperature sensor can reside near the non-volatile memory of the memory module as the non-volatile memory is more susceptible to failure at increased temperature. It will be appreciated that multiple temperature sensors can be used and monitored. For example, thermal sensors can be placed in close proximity to components known to be particularly sensitive to heat, such as near specific portions of the non-volatile memory 136, the NVM save controller 141, and the like. Particular implementations of NVM save controller 141 will be better understood with reference to FIGS. 2-6.

Figure 2:
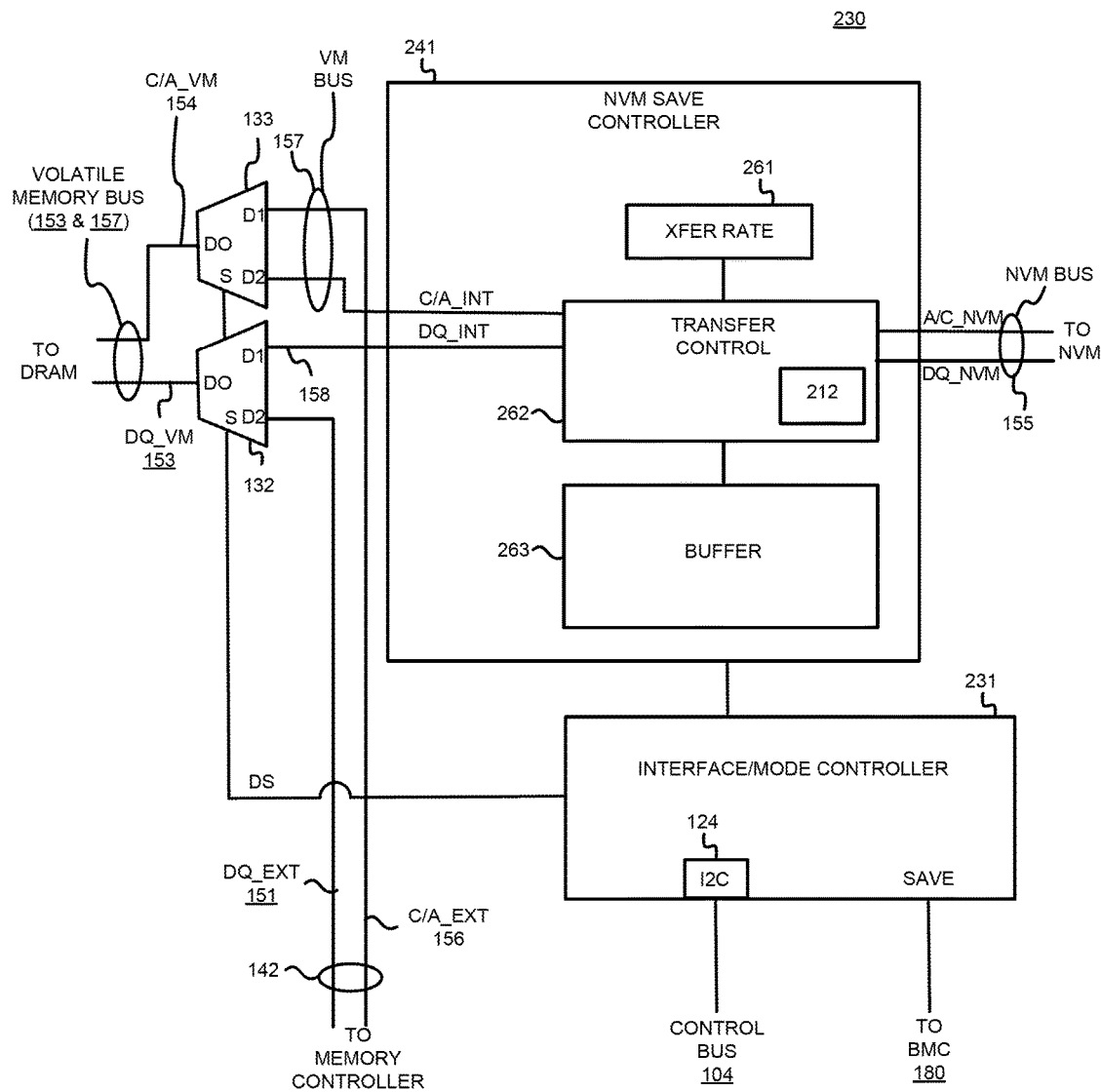
FIG. 2 is a block diagram illustrating a portion of the memory module of FIG. 1 according to an embodiment of the present disclosure.

FIG. 2 illustrates a portion of an NVDIMM 230 that can be an embodiment of the NVDIMM 130 of FIG. 1. NVDIMM 230 illustrates switch 132 as previously described, an NVM save controller 241, and an interface/mode controller 231. NVM save controller 241 includes a transfer controller 262, a register 261, and a buffer 263. Ports of the interface/mode controller 231 include control port 144 connected to control bus 104, save port 143 connected to bus 103. During normal operation, the interface/mode controller 231 will configures switches 132 and 133 to communicate data between their respective ports DO and D2, allowing the memory controller 120 to access the RAM 134. In response to receiving a refresh indicator from the system service controller 180, which indicates the NVDIMM 130 is now in self-refresh mode, the interface/mode controller will configure the switches 132 and 133 to communicate data between their respective ports DO and D1, allowing the NVM save controller 241 to access the RAM 134, thus isolating the RAM 134 from the memory controller 120. The interface/mode controller 231 can also configure power switch 138 to provide power to the NVDIMM 130 from the backup-power source 150.

NVM save controller 241 has a memory port that is connected to the nonvolatile memory 136 via a bus 155 labeled "NVM BUS" that includes a data port, DQ_NVM, and an address/control port, A/C_NVM. NVM save controller 241 has another memory port connected to switches 132 & 133 via a bus 157 labeled "VM BUS" that that includes a data port, DQ_INT that is connected to port D1 of switch 132, and an address control port, C/A_INT, connected to port D1 of switch 133.

Once the NVDIMM 230 has been isolated from the system power bus 152, and is operating under backup power, the transfer controller 262 generates separate address and control signals for each of the DRAM 134 and nonvolatile memory 136 to transfer data information from the DRAM to the nonvolatile memory at a rate based upon the value XFER RATE, which is stored at the register storage location 261. According to an embodiment, the value XFER RATE is externally stored by a master device, such as the processing complex 110, or the system service controller 180 via the I2C bus 104, or by the memory controller 120 during normal operation. According to another embodiment, described below, the XFER_RATE can be determined dynamically by the NVDIMM-N By controlling the data transfer rate during a save operation, the rate at which heat is generated by the NVDIMM 230 can be controlled.

In an embodiment, the register 261 can be externally programmed via the I2C port prior to and during a save operation of the NVDIMM 230. That is, the I2C port 144 of the NVDIMM 130 can remain in communication with a master device, e.g., the system service controller 180, under backup power during a save operation. In such an embodiment, the master can repeatedly update the value XFER RATE during the save operation to change the rate of heat dissipation, as needed. The updated value can be based upon temperature information from the temperature sensor 135 of the NVDIMM 230, which can be transmitted to the master through the I2C port 124, or from temperature information obtained from a location external the NVDIMM 230. In another embodiment, the I2C port 144 does not remain in communication with the motherboard during a save operation, in which case a master could only write the value XFER RATE to register 261 prior to initiation of the save operation. In such an embodiment, the value of XFER RATE could be determined by the motherboard based upon current or historical empirical information According to an embodiment, during the save operation, the transfer controller 263 can temporarily store data received from the DRAM in buffer 263 before sending the data to the NVM memory 136. Alternatively, the data can be provided directly to the NVM memory 136 without being buffered. The transfer rate based upon the value XFER RATE can be implemented by inserting delays between the read and write commands from the from the transfer controller 262 to one or both of the DRAM and the non-volatile memory. For example, a read command that causes the DRAM to drive data onto bus D_VM, or a write command that causes the non-volatile memory to receive data from bus D_NVM, can occur at a rate based upon the value XFER RATE. It will be appreciated that the objective of using the value XFER RATE is to control thermal output to ensure operation within appropriate thermal requirements, and not to ensure availability of power or energy.

Figure 3:
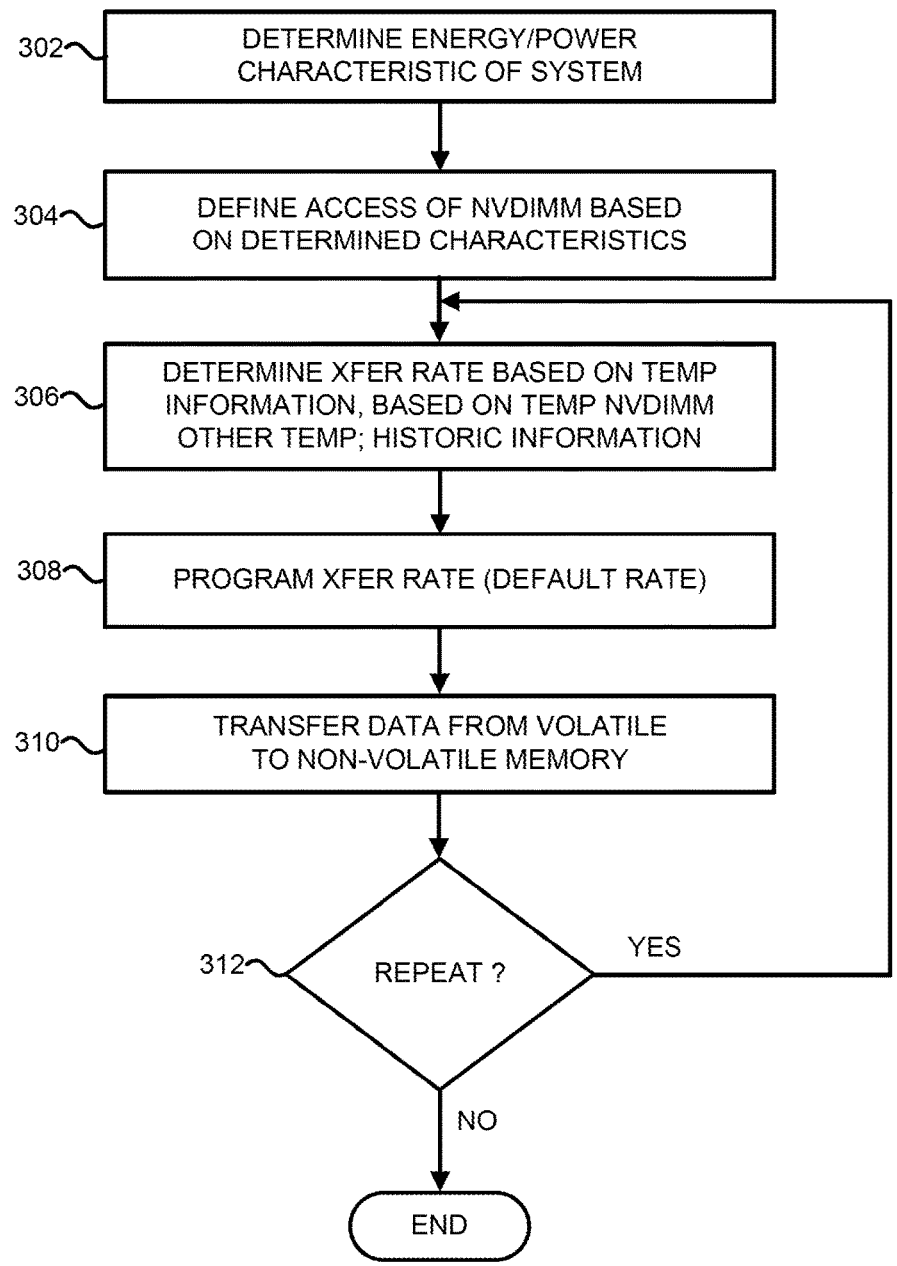
FIG. 3 is a flowchart illustrating a method for storing modified data to a non-volatile memory on an NVDIMM during a save data operation according to an embodiment of the present disclosure.

FIG. 3 illustrates a method in accordance with an embodiment of the present disclosure that can be implemented on a system including the embodiment of FIG. 2. At block 302, one or both of an energy or power characteristic of the system can be obtained and analyzed to determine if there is sufficient power and energy available in a current configuration to perform the needed save operations by NVDIMMs of the system during a power failure. According to an embodiment, this determination is based upon the configuration of the actual system that includes the NVDIMMs, as described below, and therefore, its results can vary depending upon the number of NVDIMMs installed in the overall system 100.

At block 304, the manner in which the NVDIMMs of system 100 are configured for use is defined by the system 100 based upon the energy/power characteristics determined at block 302 to ensure sufficient energy and power is available. For example, if it is determined that the maximum power needed by the NVDIMMs by a current configuration of the system is too great to ensure proper operation of simultaneous save operations during an initial period, the system can configure the NVDIMMs to have delayed save operations, thus reducing the maximum power needed. In another embodiment, the maximum power needed can be reduced by configuring the system so that some of the NVDIMMs are not used.

At block 306, a transfer rate to be implemented at one or more NVDIMMs during a save operation is determined by the system based upon temperature information. The temperature information can include historical temperature information that indicates whether the amount of heat generated by save operations of the NVDIMMs of a particular system can result in thermal conditions exceeding levels beyond which proper operation of the NVDIMM, or other component, can be guaranteed. Note that failure based upon a thermal specification can occur even when there is a guarantee of sufficient power and energy available to the NVDIMMs to perform full-speed simultaneous save operations.

In an embodiment, historical information can be used to determine an acceptable rate of heat generation by each NVDIMM of the system to ensure none of the components of the system, and in particular the NVDIMMs, overheat. A data transfer rate to be implemented by each NVDIMM of the system that corresponds to a desired rate of heat generation of that NVDIMM can then be stored by the system at each one of the NVDIMMs. It will be appreciated, that the rate at which heat is generated by an NVDIMM due to the transfer of data is effectively linearly with the transfer rate.

In another embodiment, the temperature information used to determine the transfer rate can include current temperatures that can be received from one or more of the NVDIMMs themselves, via a control port, for example, or from other system locations. Such current temperature information can be periodically gathered, and used to facilitate dynamic adjustments to the transfer rate.

At block 308, the determined transfer rate is stored at the register location. For example, a master device to the NVDIMM can provide information to a control port of the NVDIMM that indicates a particular transfer rate value is to be stored at the NVDIMM. According to an embodiment, the control port remains active during a save operation, thus allowing a master device that remains powered while other portions of the system are powered-down to receive information from, and provide information to, the NVDIMM during a power failure. In such an embodiment, the stored transfer rate indicator can be updated during the save operation. The transfer rate saved at an NVDIMM can be calculated using various calculations, including a proportional-integral-derivative (PID) calculation as implemented by PID control circuitry. In an alternate embodiment, the control port does not remain active during a save operation, such as when the control port is not powered during a power failure, in which case, the register storing the transfer rate is programmed prior to the NVDIMM being powered by the backup power source.

At block 310, a transfer controller of the NVDIMM transfers information from volatile memory storage to non-volatile memory storage during a save operation based upon the stored transfer rate At block 312, it is determined whether the value XFER RATE should be recalculated, and, if so, flow returns to block 306. Otherwise, the NVDIMM continues to perform the save operation using the current XFER RATE value, and the flow of FIG. 3 can terminate.

Figure 4:
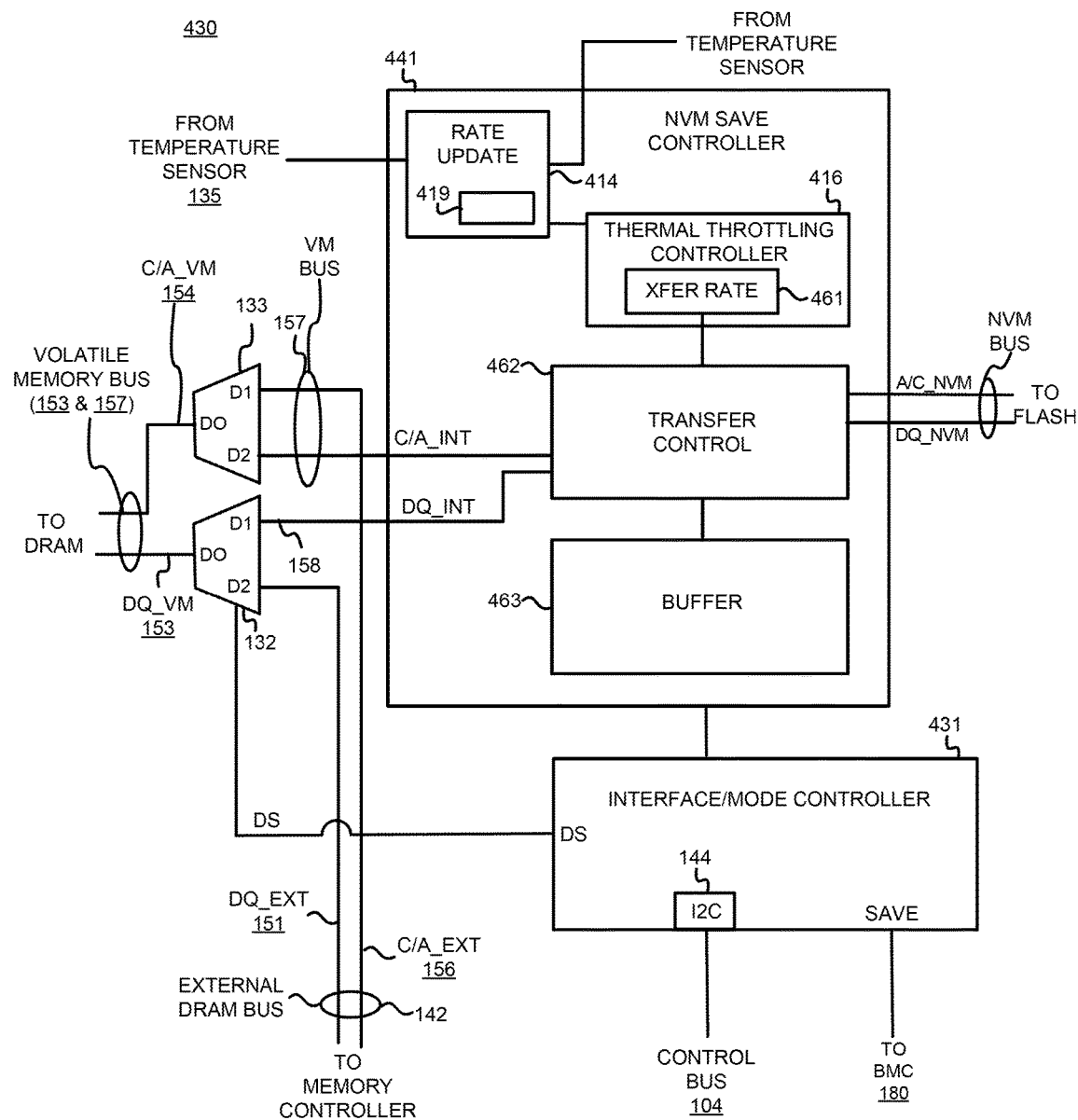
FIG. 4 is a block diagram illustrating a portion of the memory module of FIG. 1 according to an embodiment of the present disclosure.

FIG. 4 illustrates a portion of a NVDIMM 430 that can be an embodiment of the NVDIMM 130 of FIG. 1. Various portions of NVDIMM 430 that similar to those previously discussed with reference to FIG. 2 are similarly labeled. In addition, NVDIMM 430 illustrates an NVM save controller 441, and an interface/mode controller 431. NVM save controller 441 can be an embodiment of the NVM save controller 141 of FIG. 1, and includes a rate update controller 414 associated with registers 419, a thermal throttling controller 416 associated with register 461, a transfer controller 462, and a buffer 463. Transfer controller 462 and buffer 463 can operate in the same manner as the transfer controller 262 and buffer 263 of FIG. 2. During operation, the rate update controller 414 can receive temperature information from one or more temperature sensors including temperature sensor 135. The temperature information can be used by the rate update controller 414 to determine a next XFER RATE value to be stored in register 461 that will replace the current XFER RATE value, and thus becoming the current XFER RATE. How frequently the XFER RATE is to be updated can be based upon a period indicator stored at register 419. For example, a period indicator can specify how often that the temperature sensor 135 is to be evaluated, and the value XFER RATE updated. By periodically updating the transfer rate indicator based upon a temperature of the NVDIMM, a closed-loop feedback system is created that can control the thermal output rate of the NVDIMM. This process can be referred to as thermal throttling.

The circuitry of the rate update controller 414 can determine the XFER RATE value based upon any number of conventional or proprietary techniques. For example, a desired temperature or a desired temperature range can be stored at the register 419 that is used by the rate update controller 414 to determine a new XFER RATE value needed to maintain the desired temperature. According to an embodiment, a look-up table corresponding to the specified temperature can be used to determine a new XFER rate based on a current temperature. For example, entries corresponding to various temperatures of sensor 135 can be maintained at the NVDIMM 430 along with corresponding XFER RATE values that can be retrieved for its corresponding temperature entry, for a difference in current and next temperature value, historical temperature information and the like. The rate update controller 414 can alternatively include circuitry to calculate the XFER RATE based upon PID control theory using historical temperature information and the desired temperature information. It will be appreciated that the desired temperature information can be programmable by the master, fixed, and the like.

According to an embodiment, the XFER RATE value at register 461 can also be read and write accessible from a master, such as system service controller 180. In another embodiment, the XFER RATE value at register 461 is not write accessible by the master, in which case the transfer rate of the save operation of the NVDIMM is not based information from the master. In another embodiment, the master can set a maximum transfer rate within which the NVDIMM operates. Use of the rate update controller 414 to determine and set the XFER RATE value can be enabled by an enable indicator stored at register 419, wherein, when the enable indicator is asserted, thermal closed-loop thermal throttling by the NVDIM 430 is enabled, wherein the value XFER RATE is provided by the rate update controller 414 upon the temperature received from temperature sensor 135. Otherwise, a default XFER RATE value is used, which may be a maximum value, or a value less than a maximum value, or a previously stored value, and the like. As previously mentioned, when enabled, the value XFER RATE can be updated periodically, such as based upon a period value stored at the register 369.

Figure 5:
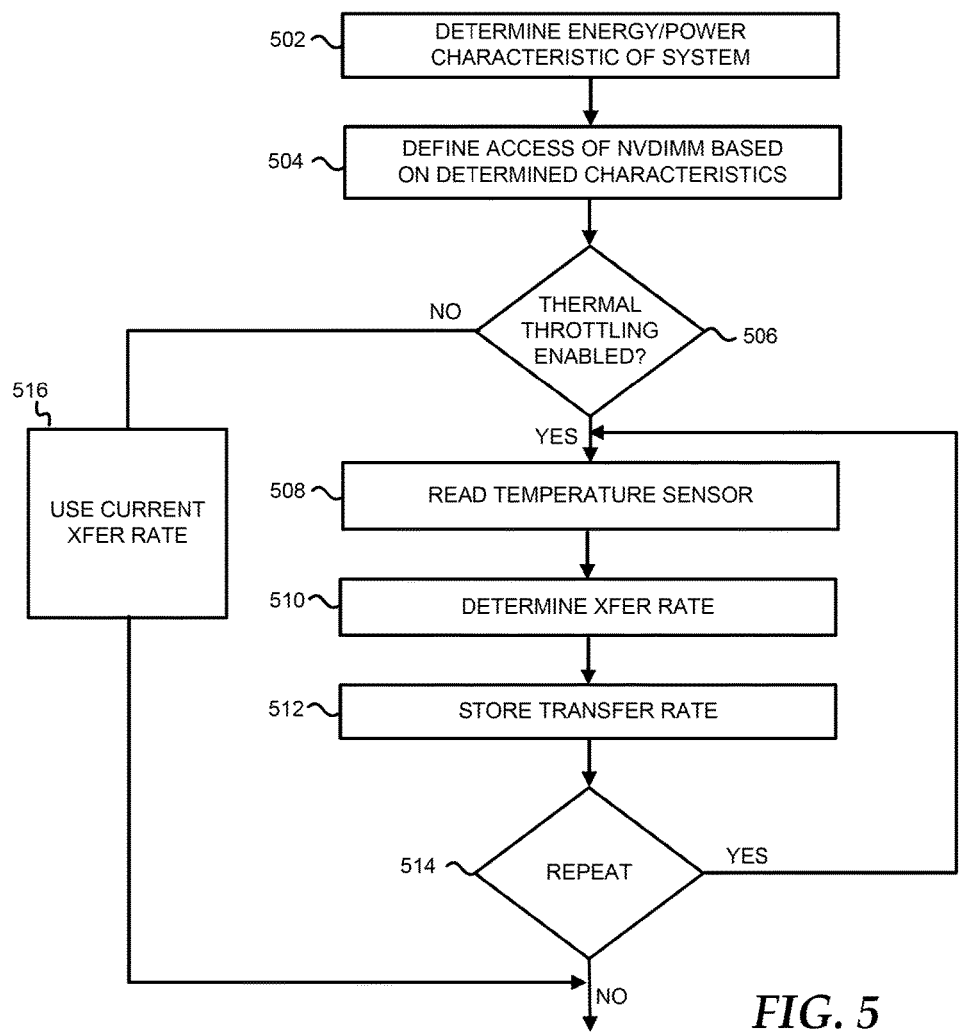
FIG. 5 is a flowchart illustrating a method for storing modified data to a non-volatile memory on an NVDIMM during a save data operation according to an embodiment of the present disclosure.

FIG. 5 illustrates a method in accordance with an embodiment of the present disclosure that can be implemented on a system including the embodiment of FIG. 4. At block 502, one or both of an energy and power characteristic of the system can be determined as previously described with reference to block 302 of the method of FIG. 3. At block 504, the manner in which the NVDIMMs of system 100 are accessed is defined at system 100 based upon the energy/power characteristics as previously described with reference to block 304 of FIG. 3.

At block 506, it is determined whether thermal throttling by the NVDIMM is to be enabled during a save operation. In an embodiment, closed-loop thermal throttling is enabled when an enable indicator stored at a register of the NVDIMM is asserted, in which case flow proceeds to block 508. Otherwise, closed-loop thermal throttling is disabled when the enable indicator is negated, and flow proceeds to block 516. According to an embodiment, the enable indicator can be programmed from a master device, such as by system service controller 180 via the I2C port.

At block 508, in response to closed-loop thermal throttling being enabled, a temperature indicator of a temperature sensor is read by a controller of the NVDIMM. At block 510, the temperature indicator is used by the NVDIMM controller to determine a transfer rate. The transfer rate indicator can be based upon any number of known or proprietary techniques as previously described herein. At block 512, a transfer rate indicator is stored at a register of the NVDIMM that is used by the NVDIMM to control the transfer rate. At block 514, it is determined whether the closed-loop operation is to continue. For example, it can be determined whether a save operation of the NVDIMM has completed. If not, and closed-loop operation is to continue, flow returns to block 508, where another temperature indicator is obtained and the transfer rate adjusted, as needed. Otherwise, closed-loop operation ends.

If at block 506 it is instead determined that the NVDIMM is not to operate in a closed-loop mode during a save operation, flow proceeds to block 516. At block 516, a current value of the transfer rate indicator at the register of the NVDIMM that controls the transfer rate, or a default value, is used, and maintained, as the current transfer rate. For example, the current value can be based upon a default value that is used when closed-loop operation is not enabled. In an embodiment, the current value can be based upon a value that was externally or internally programmed at the register.

Figure 6:
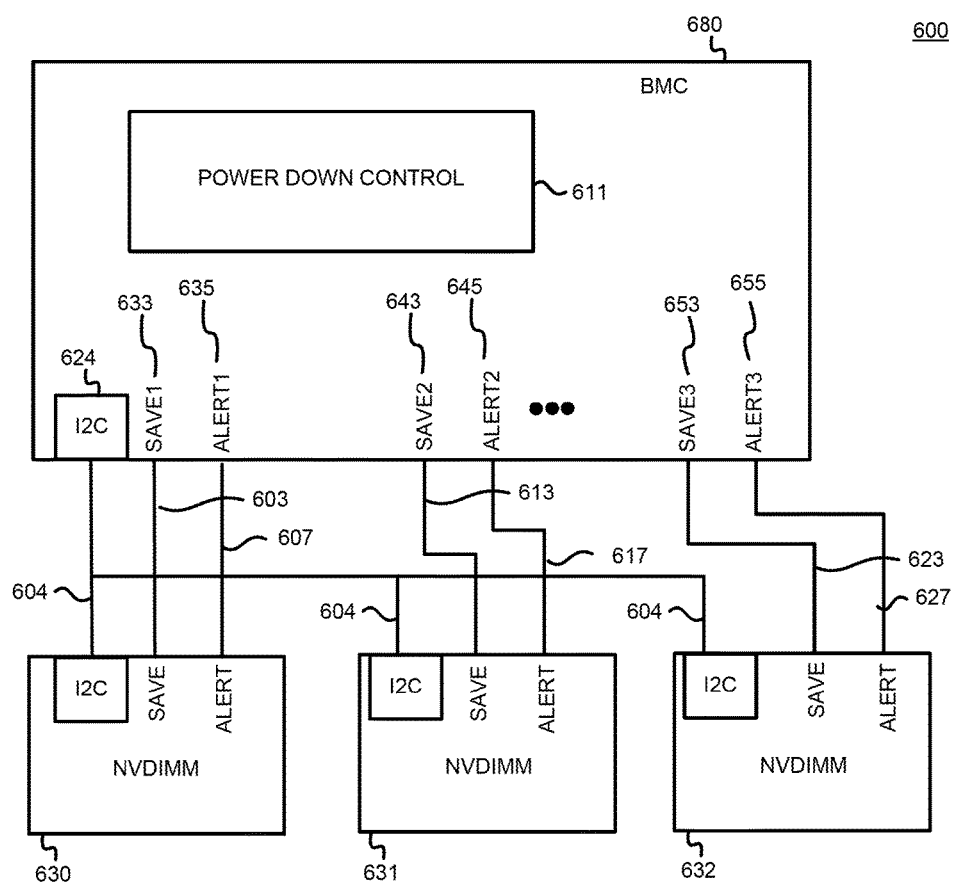
FIG. 6 is a block diagram illustrating an information handling system that includes a memory module according to an embodiment of the present disclosure.

FIG. 6 illustrates an embodiment of an information handling system 600 that includes a specific embodiment of a system service controller 680, an NVDIM 630, an NVDIMM 631, and an NVDIMM 632. The system service controller 680, can be an embodiment of the system service controller 180 previously described, and includes an I2C port 624, save ports SAVE1 633, SAVE2 643, and SAVE3 653, alert ports ALERT1 635, ALERT2 645, AND ALERT4 655. Each of NVDIMMs 630-632 include an I2C port connected to the I2C port of the system service controller 680 via a bus 604. NVDIMM 630 includes a save port connected to the SAVE1 port 633 of system service controller 680, and an alert port connected to the ALERT1 port 635. NVDIMM 631 includes a save port connected to the SAVE2 port 643 of system service controller 680, and an alert port connected to the ALERT2 port 645. NVDIMM 632 includes a save port connected to the SAVE3 port 653 of system service controller, and an alert port connected to the ALERT3 port 635.

During operation, in response to receiving a power-down indicator, such as during a power fail condition, the power-down controller 611 of the system service controller 680 will enable save operations at each one of the NVDIMMs 631-633 by asserting appropriate signals at the ports SAVE1-SAVE3. However, the timing as to when the power-down controller 611 asserts a signal to initiate their respective save operations can vary amongst the NVDIMMs 631-633. Thus, the power down controller 611 of system service controller 680 can stagger when saves operation are initiated at the NVDIMMs 630-632 by independently controlling when information is transmitted over the various SAVE ports to their respective NVDIMMs 630-631. While the embodiment of system 600, does not require rate control logic at the NVDIMMs to control the rate of heat generation, as previously described, it will be appreciated that both the thermal throttling technique described below, and the rate control technique previously described can be used together.

Figure 7:
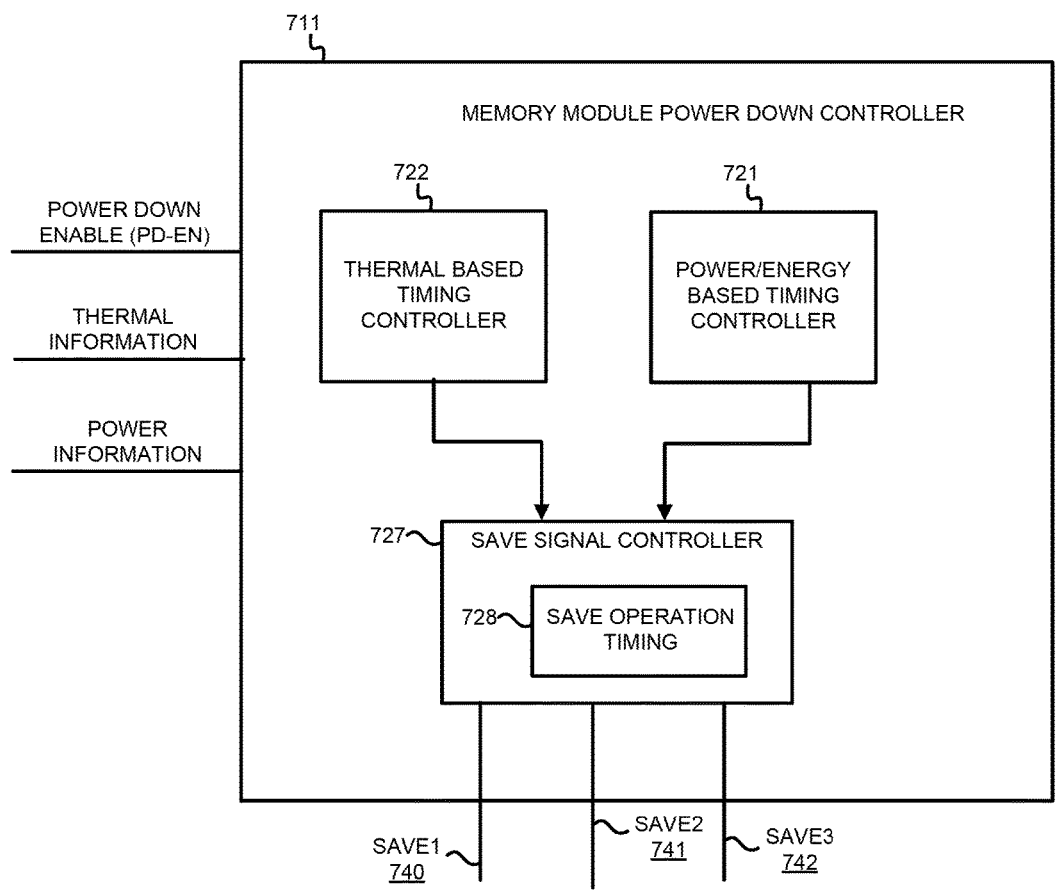
FIG. 7 illustrates an embodiment of a portion of the information handling system of FIG. 6.

FIG. 7 illustrates an embodiment of a memory module power-down (MMPD) controller 711 that can include some or all of the features of power-down controller 611 of FIG. 6. MMPD controller 711 can receive an indicator (PC_EN) from the system service controller 680 that indicates the NVDIMMs 630-632 are to be powered down. As will be discussed in greater detail below, MMPD controller 711 can also receive THERMAL INFORMATION that indicates a thermal characteristic of the information processing system 600, such as a temperature of an NVDIMM or a processing complex, that can be used by a thermal based timing controller 722 to determine a delay between when requests are sent to the NVDIMMs to initiate their respective save operations to ensure proper thermal conditions. MMPD controller 711 can also receive POWER INFORMATION that indicates a power characteristic of the information processing system 600 that can be used a power/energy based timing controller to determine when requests to initiate save operations are sent to ensure power requirements are maintained. MMPD controller 711 further includes a save signal controller 727 that provides a plurality of save signals, labeled SAVE1, SAVE2, and SAVE3. By way of example, each one of the signals SAVE1-SAVE3 is presumed to conform to the JEDEC three-pulse SAVE. Thus, each one of SAVE1-SAVE3 will provided a first pulse/indicator to indicate to its corresponding NVDIMM of an impending save operation, a second pulse/indicator to indicate when its RAM is in self-refresh, and a third pulse/indicator to indicate the save operation is to be initiates.

Thus, a first pulse is provided to each one of SAVE1-SAVE3 in response to MMPD controller 711 receiving the power down indicator, PD_EN. According to an embodiment, the first pulse can be generated at each one of the save signals SAVE1-SAVE3 at the same time. The second pulse, which indicates to an NVDIMM that it is in self-refresh mode, can be generated at each one of the save signals SAVE1-SAVE2 at the same time or at different times. For example, the each of the second pulses can be generated at the same time that is based upon an amount of that is known to be sufficiently long after the processors of a system have been notified of a power failure to ensure the various processors of the system have placed their NVDIMMs in self-refresh mode. Alternatively, the processors of the system can affirmatively communicate with the system service controller 680, such as via the I2C bus, to indicate when their corresponding NVDIMMs have been placed in self-refresh mode, and in response, the second pulse specific to that NVDIMM will be generated by MMPD controller save signal controller 727. The third pulse of each of signals SAVE1-SAVE can be generated at the same or different times based upon various power/energy and thermal considerations as described in greater detail below.

The illustrated embodiment of MMPD controller 711 includes a power/energy based timing controller 721, a thermal based timing controller 722, and a save signal controller operation timing controller 727. The save signal controller 727 generates save operation indicators, e.g., the third pulse of the JEDEC three-pulse save, based upon information received from the thermal based timing controller 722, and the power/energy based timing controller 721. The power/energy based timing controller 721 uses the power information to determine whether initiation of NVDIMM save operations needs to be delayed or staggered, and provides timing information indicative of such delays and staggering to the save signal controller 727. For example, based on the POWER INFORMATION, the power/energy based timing controller can indicate that the NVDIMMs cannot initiate their save operations for a specific amount of time due to a power requirement of another portion of the system that is independent of the NVDIMMs. For example, as discussed in greater detail below, the power needed to prepare a fan subsystem of the system 600 can necessitate delaying each NVDIMMs' save operation. The power/energy based timing controller can also determine, based on the power information, whether there is sufficient power to simultaneously enable the save operations of some or all of the NVDIMMs.

The thermal based timing controller 722 can determine, based upon the THERMAL INFORMATION, when each of the NVDIMMs can begin their save operation without overheating the system 600. For example, the thermal based timing controller may determine there is an initial period of time during which the heat present in a system after a power failure is to high to support any NVDIMM initiating its save operation, and a corresponding delay indicator can be provided to the save signal controller indicative of this period of time. The thermal controller may also determine that initiation of the NVDIMM save operations needs to be staggered to avoid generating heat a rate that would cause the system to overheat, and provide appropriate timing information to the save signal controller 727. If a timing parameter provided by the thermal based timing controller 721 is more stringent than a corresponding parameter provided by the power based timing controller 721, the more stringent parameter from the thermal based timing controller will be used by the save operation timing controller 727 to ensure proper thermal operation.

Figure 8:
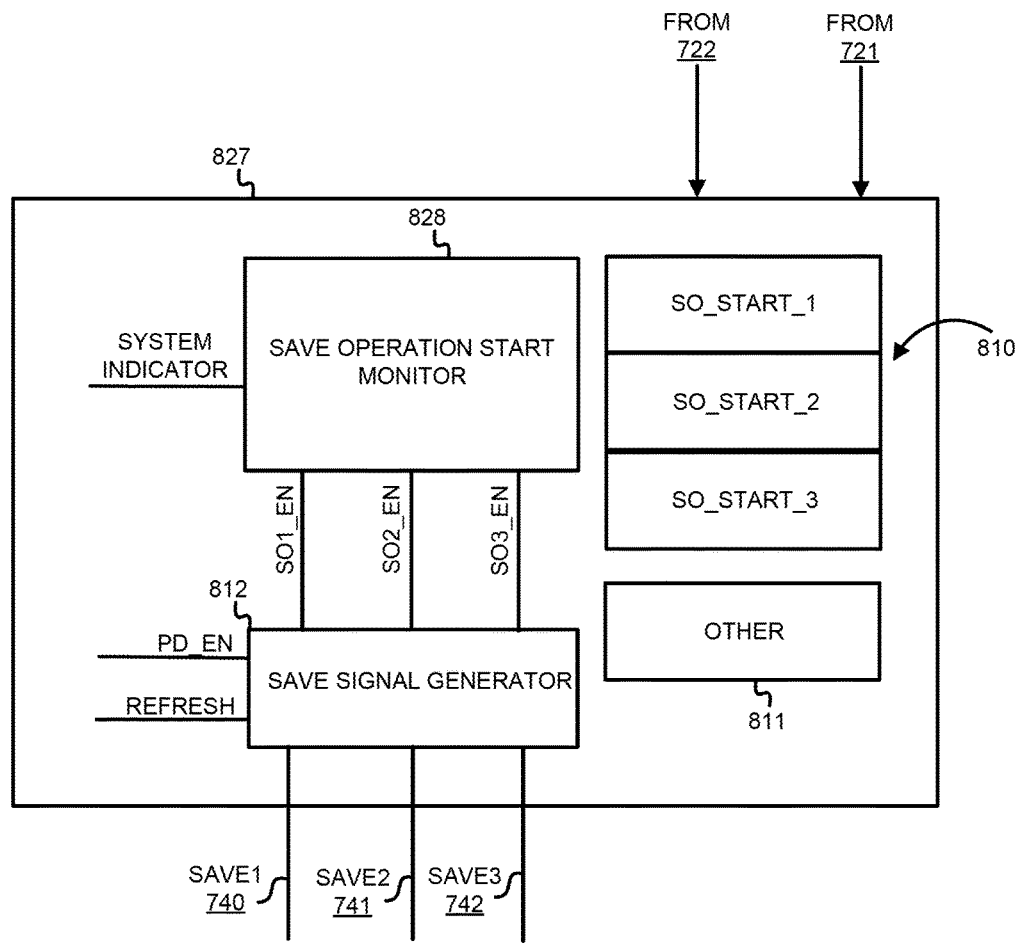
FIG. 8 illustrates an embodiment of a power-down controller that is a portion of FIG. 7.

FIG. 8 illustrates a save operation timing controller 827 that can be an embodiment of the save operation timing controller 727 of FIG. 7. Save operation timing controller 827 includes a save operation start monitor 828 that can correspond to an embodiment of the save operation timing controller 728, a save signal generator 812, a plurality of registers 810, labeled SO_START_1, SO_START_2, and SO_START_3, that one-to-one correspond to the NVDIMMs 630-633 of FIG. 6, and other registers 810. According to the illustrated embodiment, the save signal generator 812 receives signal PD_EN, REFRESH, SO1_EN, SO2_EN, AND SO3_EN, and provides the signals SAVE1-SAVE3. The save signal generator 812 will generate the first pulse of the JEDEC three-pulse SAVE_N signal simultaneously at each of the signals SAVE1-SAVE3 in response to receiving an asserted PD_EN indicator, which indicates a power down condition is occurring. The save signal generator 812 will generate the second pulse of the JEDEC three-pulse SAVE_N signal simultaneously at each of the signals SAVE1-SAVE3 in response to receiving an asserted REFRESH indicator, which indicates each of the NVDIMMs are in self-refresh mode. The save signal generator 812 will generate the third pulse of the JEDEC three-pulse save at the SAVE1-SAVE2 signals in response to receiving asserted SO1-EN-SO3_EN indicators, respectively. Thus, in the illustrated embodiment, the save operations of each of the NVDIMMs 630-632 can be initiated independent of each other based upon when the third pulse is provided.

According to an embodiment, each one of the plurality of registers 810 can include a time indicator that is used by the save operation start monitor 820 to determine when to assert signals SO1_EN-SO3_EN. The value stored at each register can be based upon the most restrictive timing information received from the power based timing controller 721 and the thermal based timing controller 722. For example, assuming power based delay times are initially stored at registers 810, in response to receiving a thermal based delay time from timing controller 722, the save operation timing controller 727 will maintain the power-based delay time at register SO_START_1, if the thermal based delay time received from the thermal based timing controller 722 is shorter than the stored delay time. Conversely, the save operation timing controller 727 will replace the power based delay time stored at register SO_START_1 if the delay time received from the thermal based timing controller 722 is greater than the stored delay time. Timing values are similarly stored at registers SO_START_2 and SO_START_3. Likewise, the more respective stagger time, e.g., the delay between the times stored at SO_START_1-SO_START_3 will be maintained.

According to an embodiment, the save operation start monitor 828 compares a clock value, represented by the SYSTEM INDICATOR signal, to the timing value stored at SO_START_1, and asserts the signal SO1_EN to initiate the save operation at NVDIMM 631 when the value stored at SO_START_1 is reached. Similarly, when the clock value matches the timing value stored at SO_START_2, the signal SO2_EN will be asserted and provided to NVDIMM 632 to initiate the save operation at NVDIMM 632. When the clock value matches the timing value stored at SO_START_3, the signal SO3_EN will be asserted and provided to NVDIMM 633 to initiate the save operation at NVDIMM 633.

Figure 9:
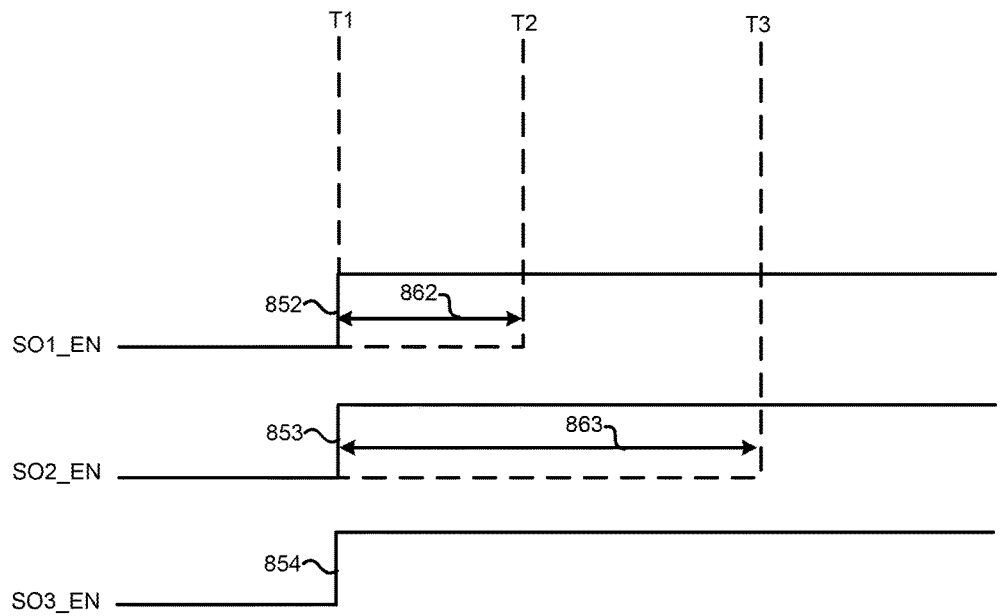
FIG. 9 illustrates a timing diagram of the operation of the information handling system of FIG. 6.

FIG. 9 illustrates a timing diagram including waveforms for the save operation enable signals SO1_EN-SO_EN3 of FIG. 8, from which the third-pulse of the JEDEC three-pulse save. Assuming that each one of the registers SO_START_1-SO_START_3 is programmed with a start time indicator corresponding to a time T1, each one of the start enable signals SO1_EN, SO2_EN, and SO3_EN will transition at time T1 as indicated by the transition edges 852-854 of the solid line portions of each timing signal. This will result in the third pulse being generated at each of the signals SAVE1-SAVE3. If it is instead assumed that SO_START_1 is programmed with a start time indicator of T2, register SO_START_2 is programmed with a start time indicator of T3, and register SO_START3 is programmed with a start time of T1, the transition edge 852 of signal SO1_EN will occur at time T3, the transition edge 853 will occur at time T4, and the transition edge 854 will occur at time T2, each as indicated by the dashed line portion of their respective timing signal. Thus, there is a delay time 862 between when NVDIMM 632 and NVDIMM 630 begin their save operations. Similarly, there is a delay time 863 between when NVDIMM 832 and NVDIMM 831 begin their save operations. According to a particular embodiment, the delay times can be greater than one second, 5 seconds, greater than one minute, greater than amount of time needed to complete a save operation by a memory module of the system, and the like.

According to an embodiment, the delay 862 can be selected to be sufficiently long to guarantee NVDIMM 633 has completed its save operation before the save operation at NVDIMM 631 is initiated. Similarly, the delay time stored at register SO_START_2 can be programmed to a value that ensures delay time 863 is sufficiently long to guarantee NVDIMM 631 has completed its save operation before the save operation at NVDIM 632 is initiated. The information used to program the registers 810 can be based upon historical information, guaranteed performance information, simulated information, and the like. In this example, enabling of the start operations is performed in a deterministic manner. That is, the relative timing of the signals SO1_EN-SO3_EN is fixed during normal operation, and therefore not based upon any run time criteria.

In an alternate embodiment, instead of controlling when save operations are initiated using predetermined timing information at the registers 810, ordering information can be saved at the registers SO_START_1-SO_START_3 that indicates an order in which NVDIMMs are to start their save operations; and the OTHER register 811 can include a system criteria indicator that indicates a system criteria, such as the occurrence of an event that will determine when the SO$n$_EN signal of the next NVDIMM is to be executed, where the order is determined by the ordering information stored in registers 810. By way of example, it is presumed that register SO_START_1 has an order indicator of one (1), register SO_START_2 has an order indicator of two (2), and register SO_START_3 has an order indicator of three (3). As such, when a particular system criteria is met, the save operation start monitor 820 will initially assert the signal SO1_EN, by virtue of its order indicator being programmed to one (1), to enable the save operation at NVDIMM 631. When the particular save criteria is met again, the save operation start monitor will next assert the signal SO2_EN to enable the save operation at NVDIMM 632. When the particular save criteria is met yet again, the save operation start monitor will assert the signal SO3_EN to enable the save operation at NVDIMM 633.

The OTHER register 811 can store information that identifies a system condition corresponding to the particular save criteria, which when met will cause the next in order of the signals SO1-EN-SO3_EN to be asserted. By way of example, it is presumed that OTHER register 811 stores a temperature threshold, and a SYSTEM INDICATOR is received at the save operation start monitor 820 (not shown)

that is a temperature indicator representative of a temperature of system 600. According to an embodiment, by knowing the rate at which heat is dissipated by the system 600, and by knowing the rate at which an individual NVDIMM generates heat, a temperature threshold value can be determined below which another NVDIMM can begin its save operation, without overheating. This value can be then be stored at register 811.

Figure 10:
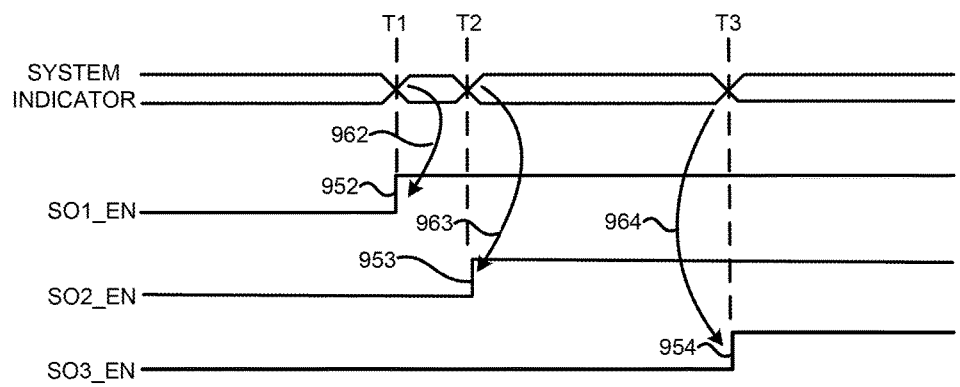
FIG. 10 illustrates a timing diagram of the operation of the information handling system of FIG. 6.

Referring to the timing diagram of FIG. 10, a new temperature indicator is received via the SYSTEM INDICATOR signal at time T1 that is less than or equal to the temperature indicator stored at OTHER register 811. In response, the save operation start monitor 820 determines that the next in-sequence start operation signal to be asserted. Thus, because register SO_START_1 has an order indicator of one (1), it's corresponding signal SO1_EN is asserted at time T1, represented by the signal edge 952, and relational arrow 962. Note that for ease of discussion, the self-refresh enable signals have not been illustrated at FIG. 10.

Subsequent to the save operation being initiated at NVDIMM 631, the save operation start monitor 820 continues to monitor the SYSTEM INDICATOR signal to determine when the system is again below the temperature specified in the OTHER register 811. Note that there may be a settling time implemented after assertion of signal SO1_EN during which no other start signal will be asserted, to ensure the thermal affects of NVDIMM 630 implementing its save operation can be effectively monitored. Such a settling time value can also be programmed at OTHER register 811.

At time T2, the value received via the SYSTEM INDICATOR signal is determined to be less than or equal to the temperature indicator stored at OTHER register 811. In response, the save operation start monitor 820 will determine that the next in-order start operation signal is to be asserted. Thus, because register SO_START_2 has an order indicator of two (2), it's corresponding signal SO2_EN is the next signal to be asserted at time T2, as represented by the signal edge 953, and relational arrow 963. At time T3, the value received via the SYSTEM INDICATOR signal is determined to be less than or equal to the temperature indicator stored at OTHER register 811. In response, the save operation start monitor 820 will determine that the next in-sequence start operation signal to be asserted. Thus, because register SO_START_3 has an order indicator of three (3), it's corresponding signal SO3_EN is the next signal to be asserted at time T2, as represented by the signal edge 943, and relational arrow 964. While not specifically illustrated, it will be appreciated that groups of NVDIMMs that are to initiate their save operations simultaneously can be specified by storing the same order indicator at their respective register of registers 810.

Figure 11:
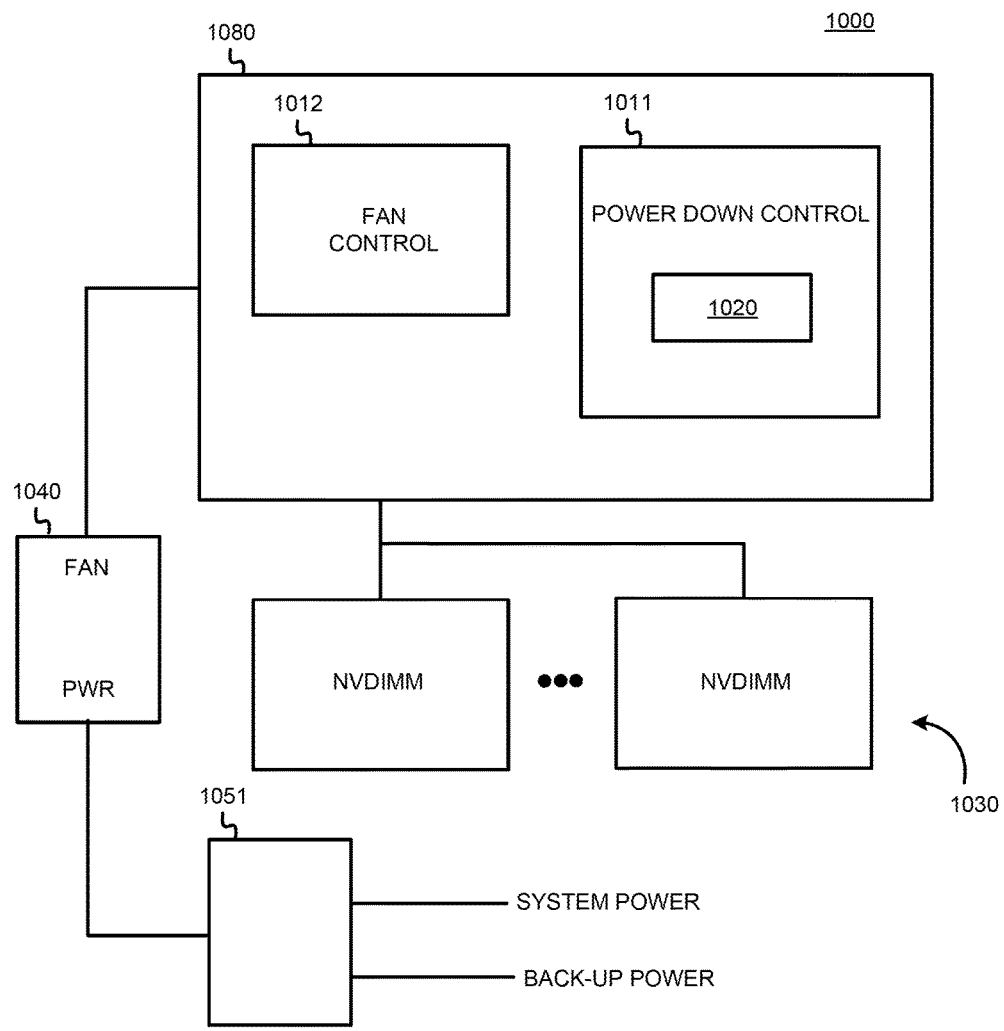
FIG. 11 is a block diagram illustrating an information handling system that includes a memory module and a fan subsystem according to an embodiment of the present disclosure.

It will be appreciated that the information represented by a SYSTEM INDICATOR signal received at the save operation start monitor 828, and criteria information stored at the OTHER register 811, can be information other than a temperature. For example, the information used to determine when to assert the signals SO_START_1-SO_START_3 can be current flow information, the rate of temperature change, and the like. FIG. 11 illustrates an embodiment of an information handling system 1000 that can delay or stagger the times at which save operations are initiated at one or more NVDIMMs based upon a fan characteristic. The information handling system 1000 includes a BMC 1080, a fan subsystem 1040, NVDIMMs 1030, and a switch 1051 that can select whether a system or back-up power source is providing power to the fan 1040.

During normal operation, the fan subsystem 1040 is power by the system power and controlled by the fan controller 1012. The fan subsystem can include circuitry 1041 that can determine and report a characteristic of the fan subsystem. For example, the circuitry 1041 can monitor and report the speed of the fan, can include a current detector used to monitor and report the current of the fan, and the like. According to an embodiment, in response to a power failure, the fan subsystem 1040 can be shutdown or powered by the back-up power source 1051, wherein the control circuitry 1020 of the power-down controller 1011 provides information to the fan controller 1012 indicating to the fan subsystem 1040 that a reduced fan speed should be implemented, that the fan should be shutdown, that power to the fan should be cut off, and the like. While it is be possible to cut the power to the fan subsystem 1040, it has been observed by the inventors that doing so can require additional circuitry to accommodate the noise associated with shutting down, and can create additional issues during a subsequent start-up of the fan subsystems. In addition, it may be desirable to maintain active cooling using a slower fan speed during a power failure. According to an embodiment, after requesting a change in fan speed, the power-down controller can set timers, using registers SO_START_1-SO_START_3 described at FIG. 8, to deterministically indicate when save operations of the NVDIMMs are to be initiated. The timers can be set to expire after a time period during which the speed of the fan is changing from an initial speed to a target speed, or during which an amount of current consumed by the fans is known to be too large to also power the save operations of the NVDIMMs.

In another embodiment, a characteristic of the fan subsystem, such as its current draw or its fan's speed, can be monitored to determine when to enable save operations at the NVDIMMs 1030. For example, one or more save operations can be enabled after the current draw of the fan subsystem has dropped below a desired threshold, stored at register OTHER 811, or after the fan speed of a fan of the fan subsystem 1040 has dropped below a desired amount. It will be appreciated, that the fan speed information and current draw information can be provided by the fan subsystem directly, or by other measurement techniques that are not part of the fan subsystem. It will be appreciated that multiple characteristic, such as a fan characteristic and a temperature characteristic can both be monitored to determine when to initiate a save operation.

Figure 12:
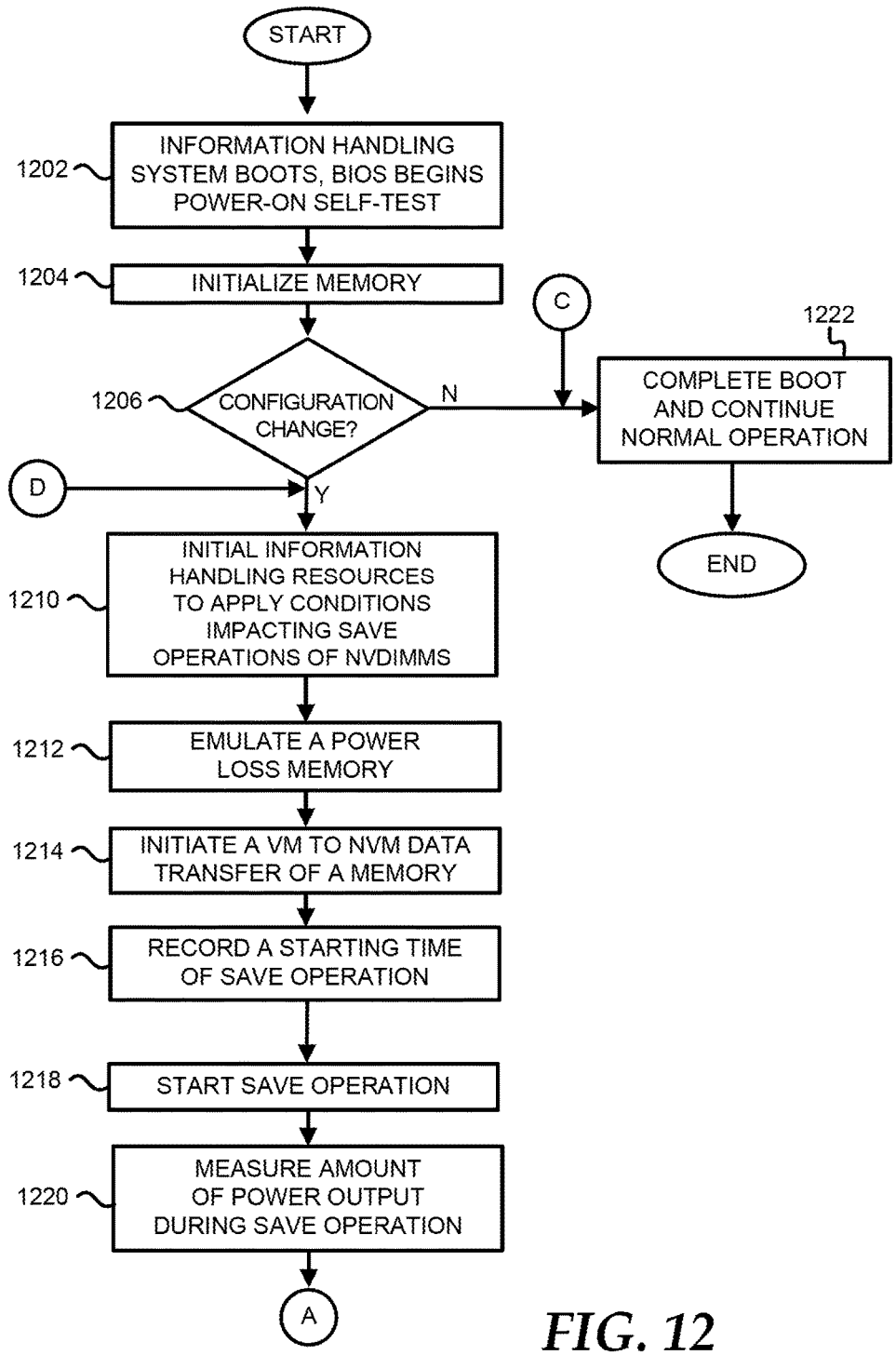
FIGS. 12-14 are flow diagrams illustrating a method in accordance with the present disclosure.

FIG. 12 illustrates a flow chart of an example method 1200 for characterization of the information handling system to determine various characteristics used to control operation of the NVDIMMs as previously described. The method 200 can be a portion of a self-test that can be performed by the information handling system, such as in response to a start-up condition. In addition to determining energy consideration of the information handing system, the method 1200 can determine various control parameters previously described. For example, the method 1200 can determine the XFER RATE value stored at register 261, the time, or order, of values stored at register 810, the thresholds stored at register 811, and the like. It will be appreciated, that various portions of the method 1200 can correspond to portions of the information handling system that have been previously described as performing similar functions.

At step 1202, information handling system can boot-up, such as during power on, and the BIOS may begin power-on self-test. A BIOS can include any system, device, or apparatus configured to identify, test, and/or initialize information handling resources of an information handling system, and/or initialize interoperation of information handling system with other information handling systems. The term "BIOS" may broadly refer to any system, device, or apparatus configured to perform such functionality, including without limitation, a Unified Extensible Firmware Interface (UEFI). In some embodiments, a BIOS may be implemented as a program of instructions that may be read by and executed on a processor to carry out the functionality of the BIOS. In these and other embodiments, the BIOS may comprise boot firmware configured to be the first code executed by a processor when information handling system is booted and/or powered on. As part of its initialization functionality, code for the BIOS may be configured to set components of the information handling system into a known state, so that one or more applications (e.g., an operating system or other application programs) stored on compatible media (e.g., disk drives) may be executed by processors of the information handling system. In some embodiments, BIOS 105 can include a management controller that performs timing characterizations for save operations as previously described. Thus, it will be appreciated that various operations of the BIOS as described below, are operations that can be performed by various software and hardware under control, or at the request, of the BIOS At step 1204, the BIOS can initialize the NVDIMMs, and other memory of the information handling system. At step 1206, it is determined if a configuration of the information handling system has changed since a last characterization. If the configuration has changed, method 1200 proceeds to step 1210. Otherwise, if the configuration is unchanged, method 1200 proceed to step 1222, where the boot operation completes and normal operation begins.

At step 1210, information handling resources of information handling system are initialized to apply conditions that can impact timing and thermals of the system during a save operation. These conditions can emulate a power loss of the information handling system. At step 1212, the BIOS can communicate with various portions of the information handling system to emulate the manner in which a power loss is handled while leaving information handling system powered on. For example, a request can be provided to a fan subsystem of the information handling system to power-down or operate at a reduced speed that is indicative of speed during a power-down condition. At step 1214, the BIOS can initiate a save operation at the NVDIMMs.

Figure 13:
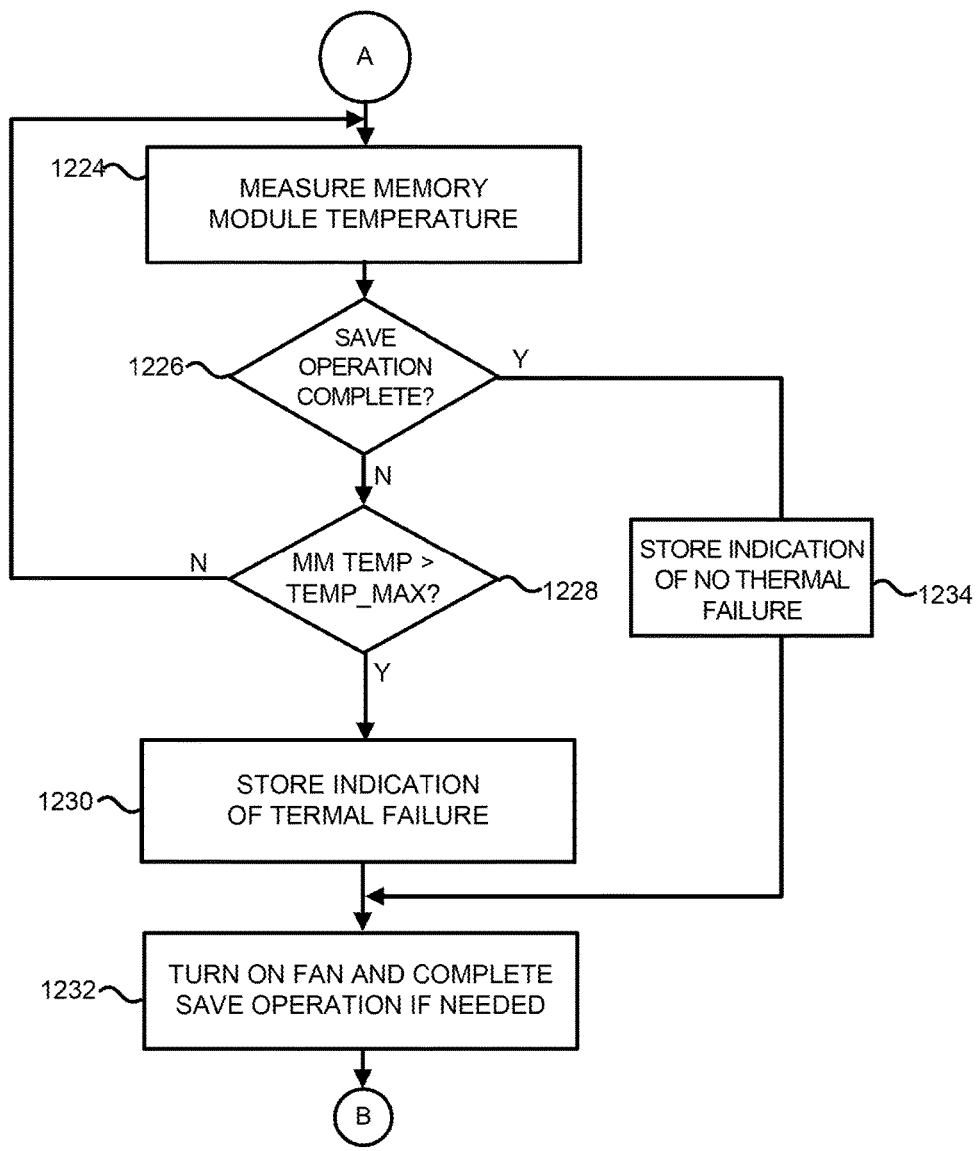

At step 1216, management controller 106 records a starting time of a the save operation. At step 1218, management controller 106 asserts a signal to cause a save operation at one or more of the NVDIMMs. At step 1220, during the save operation, the power output the system power supply is measured. At step 1224 (FIG. 13), a temperature of the memory module is received from a temperature sensor. The temperature and power values can be saved for subsequent analysis. At step 1226, it is determined whether the save operation has completed. If so, flow proceeds to step 1234, where it is noted that a thermal failure was not detected and flow continues at step 1232. Otherwise, if the save operation has completed at 1226, flow proceeds to step 1228, and it is determined if the received temperature of the memory module is greater than a temperature threshold. If not, the flow returns to step 1224 for further temperature monitoring. If the received temperature is greater than the threshold temperature, which can be the maximum temperature, the maximum temperature and a margin amount, or the like, a thermal failure condition is detected and the flow proceeds to step 1230, where it is noted that thermal failure has been detected before continuing at step 1232.

At step 1232, the fan-subsystem is restored to its normal operating condition so that further system characterization can proceed, and the save operation is allowed to complete, with the knowledge that a thermal failure was detected at step 1228 resulting in the fan being turn-on prior to completion of the save operation to prevent failure of the memory module.

Figure 14:
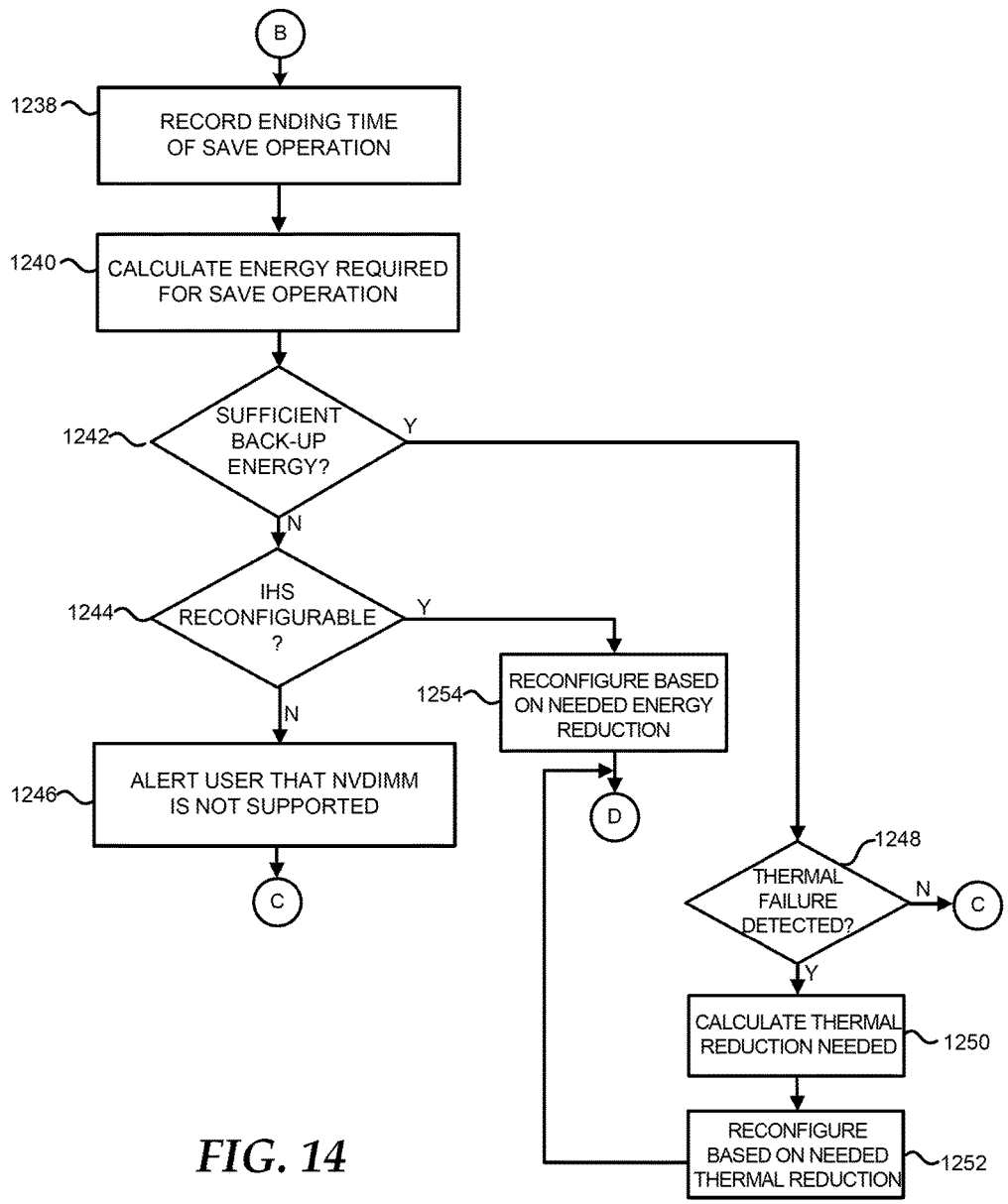

Flow proceeds from step 1232 to step 1238 (FIG. 14), wherein the characterization records an ending time for the save operation. At step 1240, the management controller may calculate the energy required to perform a save operation, including flushing of dirty cache lines to volatile memory of a memory module before transfer of data from the volatile memory to non-volatile memory of the memory module. For example, such energy may be given by $E_{save}=N \times P_{save} \times (t_{end}-t_{start})$, where $E_{save}$ is the energy associated with saving information from the processing complex during power-down, N is a constant based on a fraction of the memory on which the save operation was executed (e.g., N=1 save operation executed for the entire memory, N=4 if save operation was executed on one-fourth of cache lines flushed), $t_{end}$ is the end time, and $t_{start}$ is the start time. At step 1242, it is determined whether the energy $E_{save}$ is smaller than a hold-up energy $E_{hold-up}$ available from the back-up power system. For example, if the back-up power system represents a capacitor, the available hold-up time may be given by $E_{hold-up}=C\ (V_{max}-V_{min})/2$ where C is a capacitance of energy storage device 116, $V_{max}$ equals a voltage of the energy storage device capacitor when fully charged, and $V_{min}$ equals the voltage of such capacitor at the end of the hold-up period when it is no longer able to provide energy (which, in some embodiments, may be equal to zero). If the available hold-up energy exceeds the energy $E_{save}$ needed to perform the save operation, there is sufficient energy to completed the save operation, and method 200 proceeds to step 1248 where analysis of the thermal information begins. Otherwise, if the energy $E_{save}$ exceeds the hold-up energy $E_{hold-up}$, there is an error due to insufficient energy to complete the save operation, and method 200 proceeds to step 1244.

At step 1244, in response to a determination that there is insufficient energy available, it is determined if the information handling system can be reconfigured to reduce the energy $E_{save}$ needed to perform save operations. Reconfiguration may include modifications to reduce cache flush times, including without limitation (1) modification of write-back cache size, (2) modification of allowable memory modes (e.g., allowable error correction code modes), (3) reduced throttling levels of information handling resources of information handling system precluding NVDIMMs from being used, staggering when saved operations of NVDIMMs occur, and/or other reconfigurations. Reconfiguration may also include modifications that control when save operations are performed at each one of the NVDIMMs as previously described. According to an embodiment, the NVDIMMs of a system can be partitioned into groups of NVDIMMs, as each group is assigned a different time at which its members initiate their save operation. If the information handling system can be reconfigured to reduce the energy needed to perform save operations, the flow proceeds to step 1254. Otherwise, method 200 may proceed to step 1246. At step 1246, in response determining that information handling system can not be reconfigured to reduce the energy needed to perform save operations, an alert is provided to notify a user of information handling system that information handling system will not support some or all of the NVDIMMs due to likely thermal failure of an NVDIMM. After completion of step 1246, method 200 may proceed to step 1222 (FIG. 12).

At step 1254, in response to determining that information handling system can be reconfigured to reduce the required save energy, the information handling system is reconfigured, or information is stored that will be used to reconfigure the information handling system during a subsequent characterization or start-up. After completion of step 1254, method 200 may proceed again to step 1210 (FIG. 12) to verify this configuration.

At step 1222 (FIG. 12), in response to reconfiguration having not changed, information handling system may finish booting and continue normal operation. In the event of a power event, power management components (e.g., management controller 106, PSU 110) of information handling system may perform save operations in accordance with the most-recent non-volatile memory timing characterization operation. After completion of step 1222, method 200 may end.

If at step 1242 (FIG. 14), it is determined that that there is enough energy to complete the save operations, flow proceeds to step 1248, where it is determined whether a thermal failure occurred, as can be recorded as described at step 1234 or step 1230. If the thermal failure has not occurred, flow proceeds to step 1222 (FIG. 12. Otherwise, if a thermal failure did occur, flow proceeds to step 1250. At step 1250, the temperature information collected during execution of method 1200 is analyzed to determine the amount of thermal reduction needed, and saves configuration information to effectuate this reduction in temperature for subsequent use. For example, based upon the needed temperature reduction, it can be determined a delay between when save operations of NVDIMMs are be initiated, which can be stored at registers 810 and 811. Alternatively, it can be determined that once the current being consumed by the fan subsystem is reduced to below a threshold, one or more save operations can be implemented, wherein order and threshold information can be stored at registers 810 and 811 as previously described. Similarly, registers 810 and 811 can be programmed with temperature information that can be used to determine when to enable one or more NVDIMM save operations. In another embodiment, a temperature to be stored at register 261 of FIG. 2 that will prevent overheating can be saved, and subsequently used.

It will be appreciated that method 1200 is general in nature, and that other steps can be included, and that the listed steps can be accomplished using varying means. For example, the techniques can be applied to only a portion of an information handling system. Alternatively, to reduce wear on cells of non-volatile memory of the NVDIMMs or to prevent overwriting of recovery data already stored within non-volatile memory, the save operation may comprise a "virtual" save operation, whereby a save operation may be emulated by taking all steps necessary to accomplish a save operation other than the actual writing of data to cells of non-volatile memory of the NVDIMMs. If completion time may vary when writing to non-volatile memory, memory the NVDIMMs may provide timing acknowledgements that statistically correspond to the timing variations that would be observed when performing actual physical writes. In these and other embodiments, such "virtual" save operation may also include performing a save operation on a fraction of memory, and extrapolating energy required for a complete save operation for the entire memory capacity of memory based on the save operation on the fraction of memory. As a specific example, one-fourth of memory may be transferred from volatile memory to non-volatile memory of the NVDIMMs, and the overall energy needed to perform a save operation on all of memory may be estimated as four times that needed to perform the save operation with respect to such one-fourth of memory 104.

Figure 15:
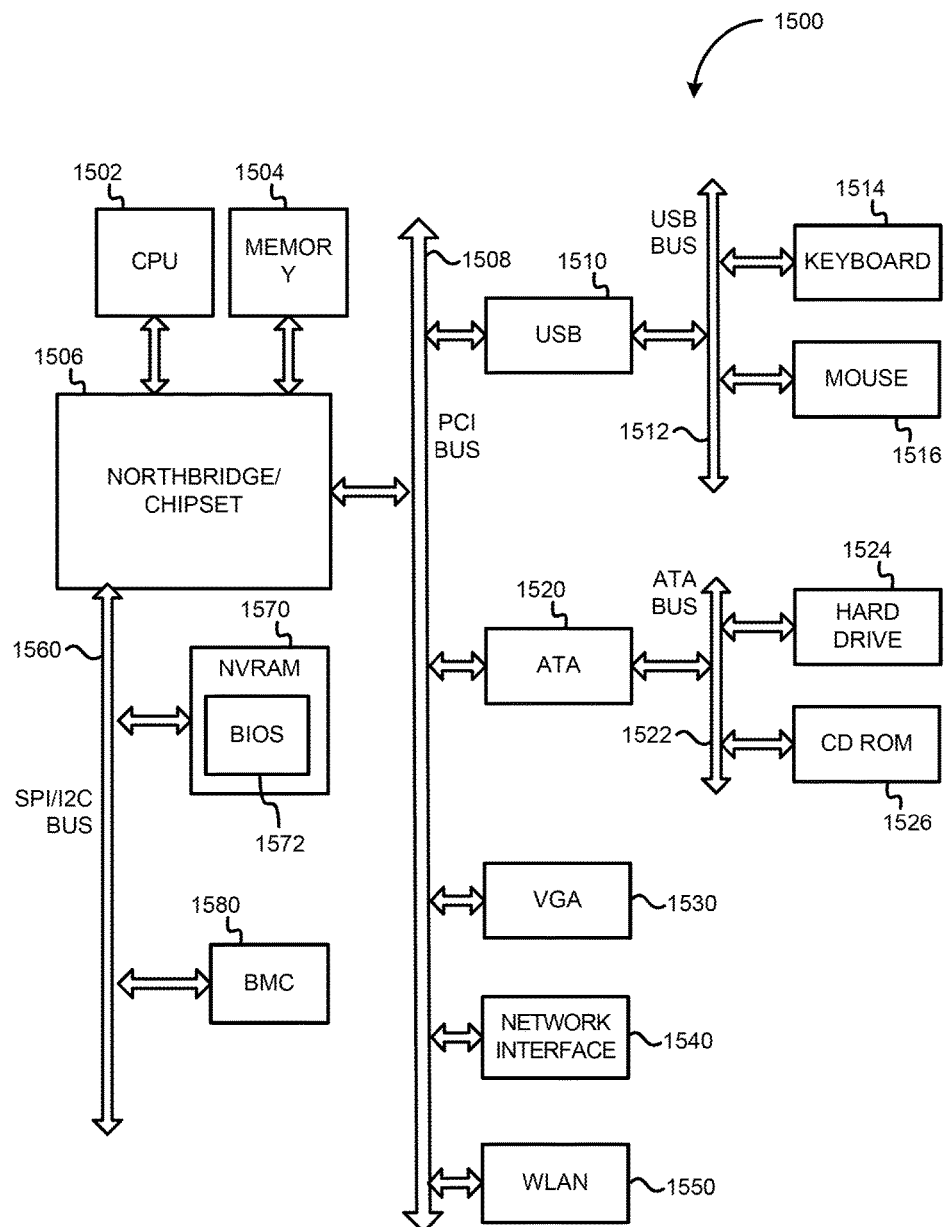
FIG. 15 is a block diagram illustrating a generalized information handling system according to an embodiment of the present disclosure.

FIG. 15 illustrates a general information handling system 1500 that can include some or all of the memory module features described herein in the context of a system including an NVDIMM. System 1500 includes a processor 1502, a memory 1504, a northbridge/chipset 1506, a PCI bus 1508, a universal serial bus (USB) controller 1510, a USB 1512, a keyboard device controller 1514, a mouse device controller 1516, a configuration an ATA bus controller 1520, an ATA bus 1522, a hard drive device controller 1524, a compact disk read only memory (CD ROM) device controller 1526, a video graphics array (VGA) device controller 1530, a network interface controller (NIC) 1540, a wireless local area network (WLAN) controller 1550, a serial peripheral interface (SPI) bus 1560, a NVRAM 1570 that can store BIOS 1572, and a baseboard management controller (BMC) 1580, which can itself be part of a system service controller as previously described. Either of memory 1504 or NVRAM 1570, or any other memories, can be implemented as an NVDIMM as described herein. BMC 1580 can be referred to as a service processor or embedded controller (EC). Capabilities and functions provided by BMC 1580 can vary considerably based on the type of information handling system. For example, the term baseboard management system is often used to describe an embedded processor included at a server, while an embedded controller is more likely to be found in a consumer-level device. As disclosed herein, BMC 1580 represents a processing device different from CPU 1502, which provides various management functions for information handling system 1500. For example, an embedded controller may be responsible for power management, cooling management, remote server management, error handling, and the like. An embedded controller included at a data storage system can be referred to as a storage enclosure processor.

For purpose of this disclosure information handling system 1500 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 1500 can be portions of a server, a personal computer, a laptop computer, a smart phone, a tablet device or other consumer electronic device, a network server, a network storage device, a switch, a router, or another network communication device, or any other suitable device and may vary in size, shape, performance, functionality, and price. Further, information handling system 1500 can include processing resources for executing machine-executable code, such as CPU 1502, a programmable logic array (PLA), an embedded device such as a System-on-a-Chip (SoC), or other control logic hardware. Information handling system 1500 can also include one or more computer-readable medium for storing machine-executable code, such as software or data.

System 1500 can include additional processors that are configured to provide localized or specific control functions, such as a battery management controller. Bus 1560 can include one or more busses, including a SPI bus, an I2C bus, a system management bus (SMBUS), a power management bus (PMBUS), and the like. BMC 1580 can be configured to provide out-of-band access to devices at information handling system 1500. As used herein, out-of-band access herein refers to operations performed prior to execution of BIOS 1572 by processor 1502 to initialize operation of system 1500.

BIOS 1572 can be referred to as a firmware image, and the term BIOS is herein used interchangeably with the term firmware image, or simply firmware. BIOS 1572 includes instructions executable by CPU 1502 to initialize and test the hardware components of system 1500, and to load a boot loader or an operating system (OS) from a mass storage device. BIOS 1572 additionally provides an abstraction layer for the hardware, such as a consistent way for application programs and operating systems to interact with the keyboard, display, and other input/output devices. When power is first applied to information handling system 1500, the system begins a sequence of initialization procedures. During the initialization sequence, also referred to as a boot sequence, components of system 1500 are configured and enabled for operation, and device drivers can be installed. Device drivers provide an interface through which other components of the system 1500 can communicate with a corresponding device.

Information handling system 1500 can include additional components and additional busses, not shown for clarity. For example, system 1500 can include multiple processor cores, audio devices, and the like. While a particular arrangement of bus technologies and interconnections is illustrated for the purpose of example, one of skill will appreciate that the techniques disclosed herein are applicable to other system architectures. System 1500 can include multiple CPUs and redundant bus controllers. One or more components can be integrated together. For example, portions of northbridge/chipset 1506 can be integrated within CPU 1502. Additional components of information handling system 1500 can include one or more storage devices that can store machine-executable code, one or more communications ports for communicating with external devices, and various input and output (I/O) devices, such as a keyboard, a mouse, and a video display. An example of information handling system 1500 includes a multi-tenant chassis system where groups of tenants (users) share a common chassis, and each of the tenants has a unique set of resources assigned to them. The resources can include blade servers of the chassis, input/output (I/O) modules, Peripheral Component Interconnect-Express (PCIe) cards, storage controllers, and the like.

Information handling system 1500 can include a set of instructions that can be executed to cause the information handling system to perform any one or more of the methods or computer based functions disclosed herein. The information handling system 1500 may operate as a standalone device or may be connected to other computer systems or peripheral devices, such as by a network.

In a networked deployment, the information handling system 1500 may operate in the capacity of a server or as a client user computer in a server-client user network environment, or as a peer computer system in a peer-to-peer (or distributed) network environment. The information handling system 1500 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 1500 can be implemented using electronic devices that provide voice, video or data communication. Further, while a single information handling system 1500 is illustrated, the term "system" shall also be taken to include any collection of systems or sub-systems that individually or jointly execute a set, or multiple sets, of instructions to perform one or more computer functions.

The information handling system 1500 can include a disk drive unit and may include a computer-readable medium, not shown in FIG. 15, in which one or more sets of instructions, such as software, can be embedded. Further, the instructions may embody one or more of the methods or logic as described herein. In a particular embodiment, the instructions may reside completely, or at least partially, within system memory 1504 or another memory included at system 1500, and/or within the processor 1502 during execution by the information handling system 1500. The system memory 1504 and the processor 1502 also may include computer-readable media.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The interface/mode controller can receive and provide information to a motherboard, for example processing complex 110. Information from the motherboard can be stored at programmable storage locations of the NVDIMM 130, such as at register 261. The term "programmable" as used herein in the context of a storage location of an NVDIMM is intended to refer to the fact that the storage location can locally or externally programmed. The term "locally programmable", and its variants, as used herein in the context of a storage location of an NVDIMM is intended to refer to the fact that the storage location can be written from a resource of the NVDIMM. For example, if values can be stored at register 261 by the NVM save controller 210, register 261 would be considered locally programmable. The term "externally programmable", and its variants, as used herein in the context of a storage location of an NVDIMM is intended to refer to the fact that the storage location can be written to from a resource external the NVDIMM. For example, if values can be stored at register 261 by a motherboard via the I2C bus, it would be considered externally programmable.

It will be appreciated that while the NVDIMM ports and busses between the processing complexes and NVDIMMs as described herein as having separate control and memory buses, in an alternate embodiment, various disclosed aspects can be implemented without a control bus. For example, instead of enabling thermal throttling and setting a desired transfer rate over a control bus, a portion of the DRAM 134 could be dedicated to storing such an enable indicator and transfer rate. With respect to FIG. 3, it will be appreciated that instead of having three separate NVDIMM ports 624-

626, the NVDIMMs 631-633 can share a common memory bus while maintaining separate SAVE and ALERT ports.

While the various embodiments described herein have been described in the context of receiving a power-down indicator. According to an embodiment, the manner in which the NVDIMMs are powered down is the same regardless as the source of the power-down indicator. For example, a user requested shutdown and a power loss condition can be handled in the same manner. Alternatively, the manner in which the NVDIMMs are powered down can vary based upon the source of the power-down indicator. For example, the various described embodiments can be used in response to a power-down request based upon a power failure condition being detected, during which there are limited system resources, such as cooling. Other sources of power-down requests that are not constrained by thermal generation, due to the full availability of system cooling for example, can be implemented without using the various thermal reduction techniques described herein. For example, the save operations can occur at all NVDIMMs at their full data rate.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The term "programmable" as used herein in the context of a storage location of an NVDIMM is intended to refer to the fact that the storage location can be locally or externally programmed. The term "locally programmable", and its variants, as used herein in the context of a storage location of a memory module, such as and NVDIMM, is intended to refer to the fact that the storage location can be written from a resource of the memory module. For example, if values can be stored at register 261 by the NVM save controller 210, register 261 would be considered locally programmable. The term "externally programmable", and its variants, as used herein in the context of a storage location of a memory module is intended to refer to the fact that the storage location can be written to from a resource external the memory module. For example, if values can be stored at register 261 by a master, such as processing complex 110, it would be considered externally programmable.

The above-disclosed subject matter is to be considered illustrative, and not restrictive, and the appended claims are intended to cover any and all such modifications, enhancements, and other embodiments that fall within the scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method comprising:
   providing memory access signals of an information handling system from a master device to a memory module to access a volatile memory of the memory module;
   providing a refresh signal to the memory module from the master device to refresh the volatile memory;
   placing the memory module into a self-refresh mode that causes the memory module to refresh the volatile memory;
   monitoring a characteristic of the information handling system while the memory module is in the self-refresh mode to determine when to initiate a save operation of the memory module, wherein the save operation transfers information stored at the volatile memory to a nonvolatile memory of the memory module; and
   initiating the save operation of the memory module by the master device, the memory module responsive to the monitoring.

2. The method of claim 1, wherein the characteristic is a thermal characteristic of the information handling system.

3. The method of claim 2, wherein the thermal characteristic is a rate of temperature change of the information handling system.

4. The method of claim 2, wherein the thermal characteristic is simulated by the information handling system.

5. The method of claim 1, wherein the thermal characteristic is a temperature of the information handling system.

6. The method of claim 5, wherein the memory module is an Non-Volatile Dual In-line Memory Module (NVDIMM), and the temperature is a temperature of the NVDIMM.

7. The method of claim 1, wherein the characteristic is a fan current of a fan subsystem of the information handling system.

8. The method of claim 1, further comprising:
   changing a speed of a fan of the information handling system from an initial speed to a target speed during a time period;
   prior to initiating the save operation, setting a timer that will expire after the time period; and
   the characteristic that is monitored is time-based, and initiating the save operation is in response to the timer expiring.

9. The method of claim 1, further comprising:
changing a speed of a fan of the information handling system from an initial speed to a slower speed in response to determining a power failure has occurred at the information handling system; and
the characteristic that is monitored is based on the fan speed, and initiating the save operation is in response to the fan speed having obtained the lower speed.

10. The method of claim 1, wherein the monitored characteristic is based on a characteristic of a fan of the Information handling system, and initiating the save operation is in response to the fan characteristic meeting a threshold.

11. A system comprising:
a first memory module including a volatile memory, a non-volatile memory, and a save controller configured to execute a save operation that transfers at least all modified information of the volatile memory to the nonvolatile memory;
a power-down controller coupled to the first memory module, the power-down controller including:
a first input to receive a first indicator that indicates the first memory module is to perform the save operation,
a second input to receive a second indicator that indicates a thermal characteristic of the system,
control circuitry to provide the save operation indicator to the first memory module to initiate the save operation in response to receiving the first indicator, and
a temperature sensor coupled to the power-down controller to provide the second indicator.

12. The system of claim 11, wherein the first memory module is an a dual in-line memory module.

13. The system of claim 11, further comprising:
a fan subsystem coupled to the power-down controller; and wherein
responsive to receiving the first indicator, the power-down controller is to change a speed of a fan of the fan subsystem from an initial speed to a slower speed, and the control circuitry determines when to provide the save operation indicator in response to a target speed of the fan being obtained.

14. The system of claim 11, further comprising:
a fan subsystem coupled to the power-down controller, the fan subsystem including a power interconnect;
a current detector to provide a current indicator based upon operation of the fan subsystem; and wherein,
responsive to receiving the first indicator, the power-down controller is to change a speed of a fan of the fan subsystem from an initial speed to a slower speed, and the control circuitry determines when to provide the save operation indicator in response to a target current of the fan subsystem being obtained.

15. The system of claim 11, further comprising:
a second memory module including a volatile memory, a non-volatile memory, and a save controller configured to execute the save operation;
wherein the first indicator further indicates the second memory module is to perform the save operation, and the control circuitry is to further determine different times at which to provide save operation indicators to the first memory module and to the second memory module based on the second indicator.

16. A method comprising:
placing first and second memory modules in self-refresh mode;
providing a first save operation indicator to the first memory module at a first time to place the first memory module in a save operation mode that transfers at least all modified information of a volatile memory of the first memory module to a nonvolatile memory of the first memory module; and
providing a second save operation indicator to the second memory module at a second time to place the second memory module in the save operation mode that transfers at least all modified information of a volatile memory of the second memory module to a nonvolatile memory of the second memory module, wherein a duration between the first time and the second time is greater than one second.

17. The method of claim 16, wherein the duration is greater than five seconds.

18. The method of claim 16, wherein the duration is greater than the time needed by the first memory module to complete the transfer.

19. The method of claim 16, wherein the second time is based upon receiving an indicator that a save operation of the first memory module has completed.

* * * * *